US011343549B2

(12) United States Patent
Kitahara et al.

(10) Patent No.: US 11,343,549 B2
(45) Date of Patent: May 24, 2022

(54) RECEPTION APPARATUS, RECEPTION METHOD, TRANSMISSION APPARATUS, AND TRANSMISSION METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/109,915

(22) PCT Filed: Oct. 30, 2015

(86) PCT No.: PCT/JP2015/080663
§ 371 (c)(1),
(2) Date: Jul. 6, 2016

(87) PCT Pub. No.: WO2016/076137
PCT Pub. Date: May 19, 2016

(65) Prior Publication Data
US 2016/0330490 A1    Nov. 10, 2016

(30) Foreign Application Priority Data
Nov. 13, 2014    (JP) .............................. JP2014-231107

(51) Int. Cl.
*H04N 21/434* (2011.01)
*H04N 21/235* (2011.01)
(Continued)

(52) U.S. Cl.
CPC ......... *H04N 21/235* (2013.01); *H04N 21/236* (2013.01); *H04N 21/2362* (2013.01);
(Continued)

(58) Field of Classification Search
None
See application file for complete search history.

(56) References Cited

U.S. PATENT DOCUMENTS 8,537,746 B2 *   9/2013   Song .................... H04N 21/235
                                                                370/328
9,432,431 B2 *   8/2016   O'Malley ........... H04L 65/4084
(Continued)

FOREIGN PATENT DOCUMENTS

EP    2 043 291 A2    4/2009
JP    2002-534017 T2   10/2002
(Continued)

OTHER PUBLICATIONS

Rich Chernock: "Next Generation Television: ATSC 3.0", San Diego BTS Chapter, Oct. 30, 2014 (Oct. 30, 2014), XP055452808, Retrieved from the Internet: URL:http://s3.amazonaws.com/sdieee/1776-SanDiego_ATSC3_Overview_Chernock.pptx.pdf [retrieved on Feb. 21, 2018] p. 30-37, p. 43.
(Continued)

*Primary Examiner* — Gims S Philippe
*Assistant Examiner* — Charles N Hicks
(74) *Attorney, Agent, or Firm* — Chris Kolefas

(57) ABSTRACT

The present technique relates to a reception apparatus, a reception method, a transmission apparatus, and a transmission method capable of supporting various service modes. The reception apparatus obtains first meta data including class information for providing, in multiple modes, a service transmitted via a digital broadcast signal using an IP transmission method, and controls reproduction of a component of the service by processing a stream including the component of the service for each of the multiple modes based on the class information included in the first meta data. The present technique can be applied to, for example, a fixed
(Continued)

receiver such as a television receiver, a mobile receiver such as a smartphone, and the like.

20 Claims, 22 Drawing Sheets

(51) Int. Cl.
*H04N 21/438* (2011.01)
*H04N 21/462* (2011.01)
*H04N 21/236* (2011.01)
*H04N 21/61* (2011.01)
*H04N 21/63* (2011.01)
*H04N 21/2362* (2011.01)
*H04N 21/2381* (2011.01)
*H04N 21/435* (2011.01)
*H04N 21/643* (2011.01)

(52) U.S. Cl.
CPC ....... *H04N 21/2381* (2013.01); *H04N 21/435* (2013.01); *H04N 21/438* (2013.01); *H04N 21/4345* (2013.01); *H04N 21/4622* (2013.01); *H04N 21/6125* (2013.01); *H04N 21/631* (2013.01); *H04N 21/64322* (2013.01)

(56) References Cited

U.S. PATENT DOCUMENTS

| | | | | |
|---|---|---|---|---|
| 2003/0009769 A1* | 1/2003 | Hensgen | ............... | H04N 21/818 725/131 |
| 2007/0072579 A1* | 3/2007 | Paila | ................. | H04W 52/0229 455/343.2 |
| 2008/0112551 A1* | 5/2008 | Forbes | .................... | H04L 9/321 379/142.1 |
| 2010/0138646 A1* | 6/2010 | Aloni | ................. | H04N 21/2343 713/150 |
| 2010/0231803 A1 | 9/2010 | Citta et al. | | |
| 2011/0126232 A1* | 5/2011 | Lee | ..................... | H04N 21/6408 725/39 |
| 2012/0307159 A1 | 12/2012 | Ouchi et al. | | |
| 2013/0305304 A1* | 11/2013 | Hwang | .................. | H04L 65/608 725/109 |
| 2013/0305308 A1* | 11/2013 | Lee | ......................... | H04H 20/40 725/116 |
| 2014/0109128 A1* | 4/2014 | Lee | ..................... | H04N 21/4622 725/25 |
| 2014/0218474 A1* | 8/2014 | Hong | ............. | H04N 21/234327 348/43 |
| 2014/0219266 A1 | 8/2014 | Song et al. | | |
| 2015/0171997 A1 | 6/2015 | Ko et al. | | |
| 2015/0215369 A1 | 7/2015 | Yamagishi | | |
| 2015/0229878 A1 | 8/2015 | Hwang et al. | | |
| 2017/0055046 A1* | 2/2017 | Lee | ..................... | H04N 21/234 |

FOREIGN PATENT DOCUMENTS

| | | |
|---|---|---|
| JP | 2008-263616 A | 10/2008 |
| JP | 2011-501926 A | 1/2011 |
| KR | 10-2010-0105314 A | 9/2010 |
| KR | 10-2011-0116023 A | 10/2011 |
| WO | 2012/077353 A1 | 6/2012 |
| WO | WO 2012/099427 A2 | 7/2012 |
| WO | 2014/025213 | 2/2014 |
| WO | 2014/042028 A1 | 3/2014 |

OTHER PUBLICATIONS

Office Action issued in corresponding Chinese Application No. 2015800038872 dated Jun. 12, 2019 (with English translation), 15 pages.
"Final Report on ATSC 3.0 Next Generation Broadcast Television," ATSC Planning Team 2, Sep. 21, 2011, 40 pages.

* cited by examiner

FIG. 2

| SIGNALING DATA | | META DATA | CONTENTS |
|---|---|---|---|
| LLS | FIC | Fast Information Channel | CONFIGURATION INFORMATION ABOUT BBP STREAM AND SERVICE AND THE LIKE |
| | SCD | Service Configuration Description | CONFIGURATION INFORMATION ABOUT SERVICE AND THE LIKE |
| | EAD | Emergency Alert Description | EMERGENCY WARNING INFORMATION |
| | RRD | Rating Region Description | RATING INFORMATION |
| | DCD | Default Component Description | INFORMATION TO BE OBTAINED IN ADVANCE |
| SCS | USBD | User Serivice Bundle Description | REFERENCE INFORMATION OF META DATA |
| | USD | User Service Description | DISTRIBUTION ROUTE IDENTIFICATION INFORMATION AND THE LIKE |
| | SDP | Session Description Protocol | CONFIGURATION INFORMATION ABOUT STREAM AND THE LIKE |
| | MPD | Media Presentation Description | REPRODUCTION MANAGEMENT INFORMATION ABOUT STREAM |
| | IS | Initialization Segment | INITIALIZATION SEGMENT |
| | LSID | LCT Session Instance Description | MANAGEMENT INFORMATION TRANSMITTED FOR EACH ROUTE SESSION |
| | ESGc | Electric Service Guide Current | ESG CURRENT |
| | SPD | Service Parameter Description | PARAMETER OF SERVICE LEVEL |

FIG. 3

| signaling scopeall | SCS_shortcut | hybrid | RECEPTION APPARATUS 20A (CAPABLE OF RECEIVING BOTH BROADCAST AND COMMUNICATION) | RECEPTION APPARATUS 20B (CAPABLE OF RECEIVING ONLY BROADCAST) | Case |
|---|---|---|---|---|---|
| FALSE (ONLY COMPONENTS FOR BROADCAST) | TRUE (basic) | FALSE (broadcast) | LSID, MPD | LSID, MPD | A |
| | TRUE (basic) | TRUE (hybrid) | All SCS (*) | LSID, MPD | B |
| | FALSE (rich) | FALSE (broadcast) | All SCS | All SCS | C |
| | FALSE (rich) | TRUE (hybrid) | All SCS (*) | All SCS | D |
| TRUE (COMPONENTS FOR BOTH BROADCAST AND COMMUNICATION) | TRUE (basic) | FALSE (broadcast) | LSID, MPD | LSID, MPD | E |
| | TRUE (basic) | TRUE (hybrid) | All SCS | LSID, MPD | F |
| | FALSE (rich) | FALSE (broadcast) | All SCS | All SCS | G |
| | FALSE (rich) | TRUE (hybrid) | All SCS | All SCS | H |

FIG. 10

| Syntax | No. of bits | Mnemonic | Description | Note |
|---|---|---|---|---|
| FIC | | | | |
| { | | | | |
|   FIC_protocol_version | 8 | uimsbf | Protocol version | |
|   Broadcast_stream_id | 16 | uimsbf | Broadcast Stream ID | |
|   SCD_exist_flag | 1 | bslbf | Indicates SCD is delivered in LLS | |
|   reserved | 7 | bslbf | | |
|   If (SCD_exist_flag) { | | | | |
|     Bbpstream_id | 8 | uimsbf | BBP Stream ID which LLS is delivered | |
|   } | | | | |
|   FIC_level_descriptor () | var | | FIC-level descriptor | |
|   num_services | 8 | uimsbf | Number of Service | |
|   for (i=0; i<num_services; i++) { | | | | |
|     bbpstream_id | 8 | uimsbf | The ID of one BBP stream which carries SCS | |
|     provider_id | 16 | uimsbf | Provider ID | |
|     service_id | 16 | uimsbf | Service ID | |
|     service_data_version | 8 | uimsbf | Version number of SCS | |
|     service_category | 5 | uimsbf | Service category (e.g. A/V, audio, ESG, NRT) | |
|     short_service_name_length | 3 | uimsbf | Length of short service name | |
|     short_service_name | 16*m | bslbf | Short service name | |
|     service_status | 3 | uimsbf | Service status (active/inactive/show/hidden) | |
|     IP_version_flag | 1 | bslbf | IP packet version (IPv4/IPv6) | |
|     signalingscopeall | 1 | bslbf | Scope of SCS delivered via broadcast | |
|     num_of_class | 3 | bslbf | number of class | |
|     for (num_of_class) { | | | | |
|       class_id | 4 | bslbf | Class id (e.g. core, enhance) | |
|       sp_indicator | 1 | bslbf | Service protection | |
|       SCS_src_IP_addr_flag | 1 | bslbf | Indicate source IP address is delivered or not | |
|       reserved | 2 | bslbf | | |
|       if(SCS_source_IP_address_flag) { | | | | |
|         SCS_src_IP_addr | 32 or 128 | uimsbf | Source IP address | |
|       } | | | | |
|       SCS_dst_IP_addr | 32 or 128 | uimsbf | Destination IP address | |
|       SCS_dst_port | 16 | uimsbf | UDP port number | |
|       SCS_TSI | 16 | uimsbf | TSI number | |
|       SCS_shortcut | 1 | bslbf | Indicate broadcast service is basic or not | |
|       hybrid | 1 | bslbf | Indicate hybrid service or not | |
|       reserved | 6 | bslbf | | |
|     } | | | | |
|   } | | | | |
| } | | | | |

FIG. 11

| Element/Attribute(with@) | | | Cardinality | Data Type | Description |
|---|---|---|---|---|---|
| SCD | | | | | |
| | @majorProtocolVersion | | 0..1 | integer | Major protocol version |
| | @minorProtocolVersion | | 0..1 | integer | Minor protocol version |
| | @broadcaststreamId | | 1 | integer | physical channel ID |
| | @name | | 0..1 | string | physical channel name |
| | Tuning_RF | | 0..n | | Physical parameters |
| | | @frequency | 1 | integer | Center frequency of this RF channel |
| | | @preamble | 0..1 | string | Common PHY parameter of this RF channel |
| | Service | | 1..n | | Service |
| | | @serviceId | 1 | integer | Service ID (major+minor) |
| | | @globalUniqueServiceId | 1 | string | Global unique service ID |
| | | @longName | 0..1 | string | Long service name |
| | SignalingOverInternet | | 0..1 | anyURI | SCS location of broadband |
| | | @uri | 1 | | Signaling URI |

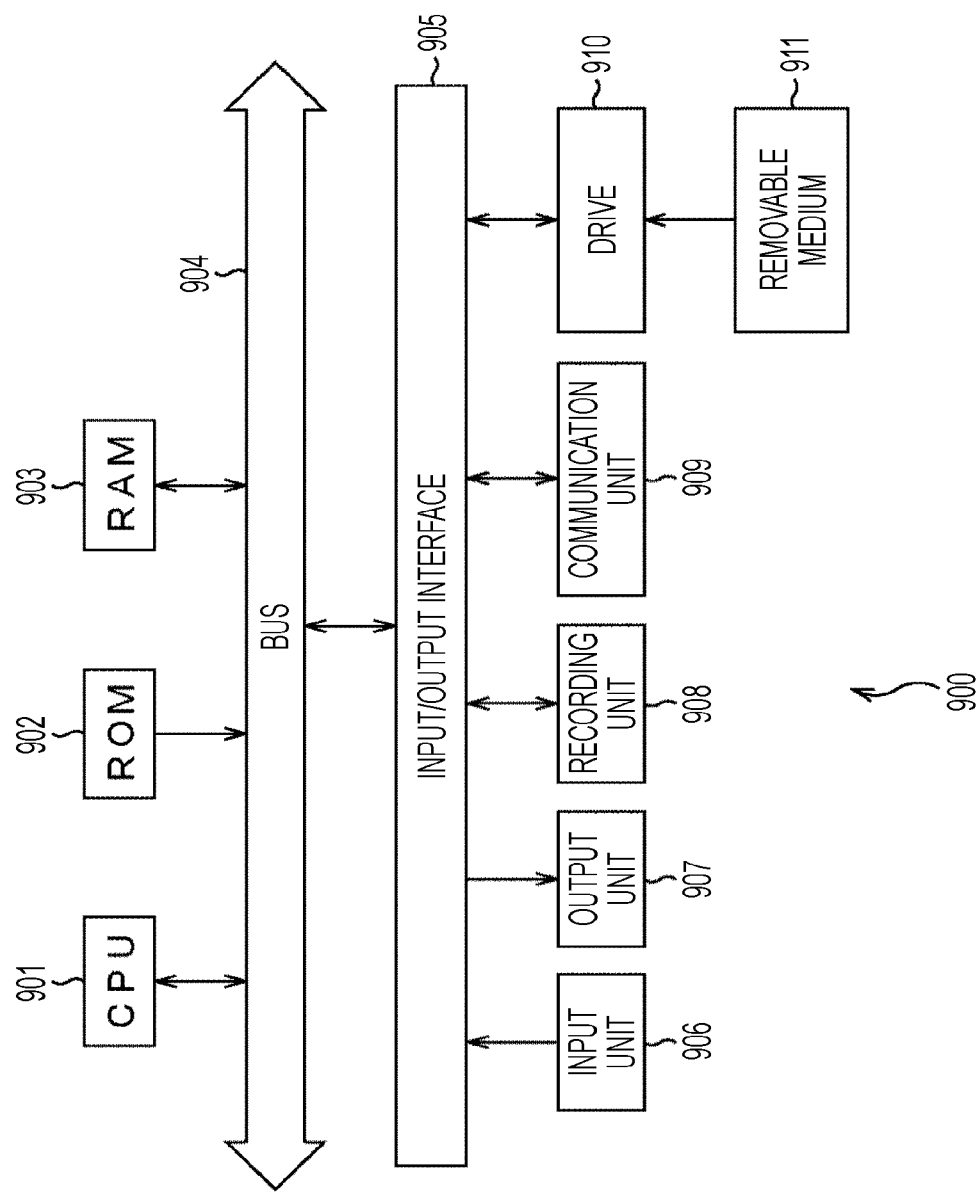

RECEPTION APPARATUS, RECEPTION METHOD, TRANSMISSION APPARATUS, AND TRANSMISSION METHOD

TECHNICAL FIELD

The present technique relates to a reception apparatus, a reception method, a transmission apparatus, and, a transmission method, and more particularly, relates to a reception apparatus, a reception method, a transmission apparatus, and a transmission method capable of supporting various service modes.

BACKGROUND ART

In recent years, in various countries, digital broadcast services have started (for example, see Patent Document 1). In digital broadcast standards in various countries, Moving Picture Experts Group phase 2-Transport Stream (MPEG2-TS) method is employed as a transmission method, but in the future, it is expected to introduce IP transmission method using Internet Protocol (IP) packets used in the field of communication for digital broadcast, so that more advanced services are provided.

CITATION LIST

Patent Document

Patent Document 1: Japanese Patent Application Laid-Open No. 2008-263616

SUMMARY OF THE INVENTION

Problems to be Solved by the Invention

By the way, a candidate of a method for transmitting components such as video, audio, and subtitles by using the IP transmission method includes Real-time Object Delivery over Unidirectional Transport (ROUTE). ROUTE is made by expanding File Delivery over Unidirectional Transport (FLUTE) in order to support live services for broadcast.

However, a technical method for transmitting a component constituting a service (for example, a program) via a ROUTE session has not yet been established, and there has been a demand to support various kinds of service modes.

The present technique has been made in view of such circumstances, and the present technique enables supporting various kinds of service modes.

Solutions to Problems

A reception apparatus according to a first aspect of the present technique includes: a first obtaining unit obtaining first meta data including class information for providing, in multiple modes, a service identified by an IP address and transmitted by a broadcast wave of digital broadcast using an Internet Protocol (IP) transmission method; and a control unit controlling reproduction of a component by connecting to a stream of the component constituting the service for each of the multiple modes on the basis of the class information included in the first meta data.

The reception apparatus according to the first aspect of the present technique may be an independent apparatus, or may be an internal block constituting a single apparatus. The reception method according to the first aspect of the present technique is a reception method corresponding to the reception apparatus according to the first aspect of the present technique.

In the reception apparatus and the reception method according to the first aspect of the present technique, first meta data including class information for providing, in multiple modes, a service identified by an IP address and transmitted by a broadcast wave of digital broadcast using an Internet Protocol (IP) transmission method is obtained, and reproduction of a component is controlled by connecting to a stream of the component constituting the service for each of the multiple modes on the basis of the class information included in the first meta data.

A transmission apparatus according to a second aspect of the present technique includes: a generation unit generating first meta data including class information for providing, in multiple modes, a service identified by an IP address and transmitted by a broadcast wave of digital broadcast using an Internet Protocol (IP) transmission method; and a transmission unit transmitting the generated first meta data.

The transmission apparatus according to the second aspect of the present technique may be an independent apparatus, or may be an internal block constituting a single apparatus.

The transmission method according to the second aspect of the present technique is a transmission method corresponding to the transmission apparatus according to the second aspect of the present technique.

In the transmission apparatus and the transmission method according to the second aspect of the present technique, first meta data including class information for providing, in multiple modes, a service identified by an IP address and transmitted by a broadcast wave of digital broadcast using an IP transmission method is generated, and the generated first meta data is transmitted.

EFFECTS OF THE INVENTION

According to the first aspect and the second aspect of the present technique, various kinds of service modes can be supported.

It should be noted that the effects described here are not necessarily limited, and may be any one of the effects described in this disclosure.

BRIEF DESCRIPTION OF DRAWINGS

FIG. 2 is a figure illustrating an example of signaling data.

FIG. 3 is a figure illustrating signaling data to be received in accordance with service types.

FIG. 10 is a figure illustrating an example of syntax of FIC.

FIG. 11 is a figure illustrating an example of syntax of SCD.

FIG. 22 is a figure illustrating a configuration example of a computer.

MODE FOR CARRYING OUT THE INVENTION

Figure 1:
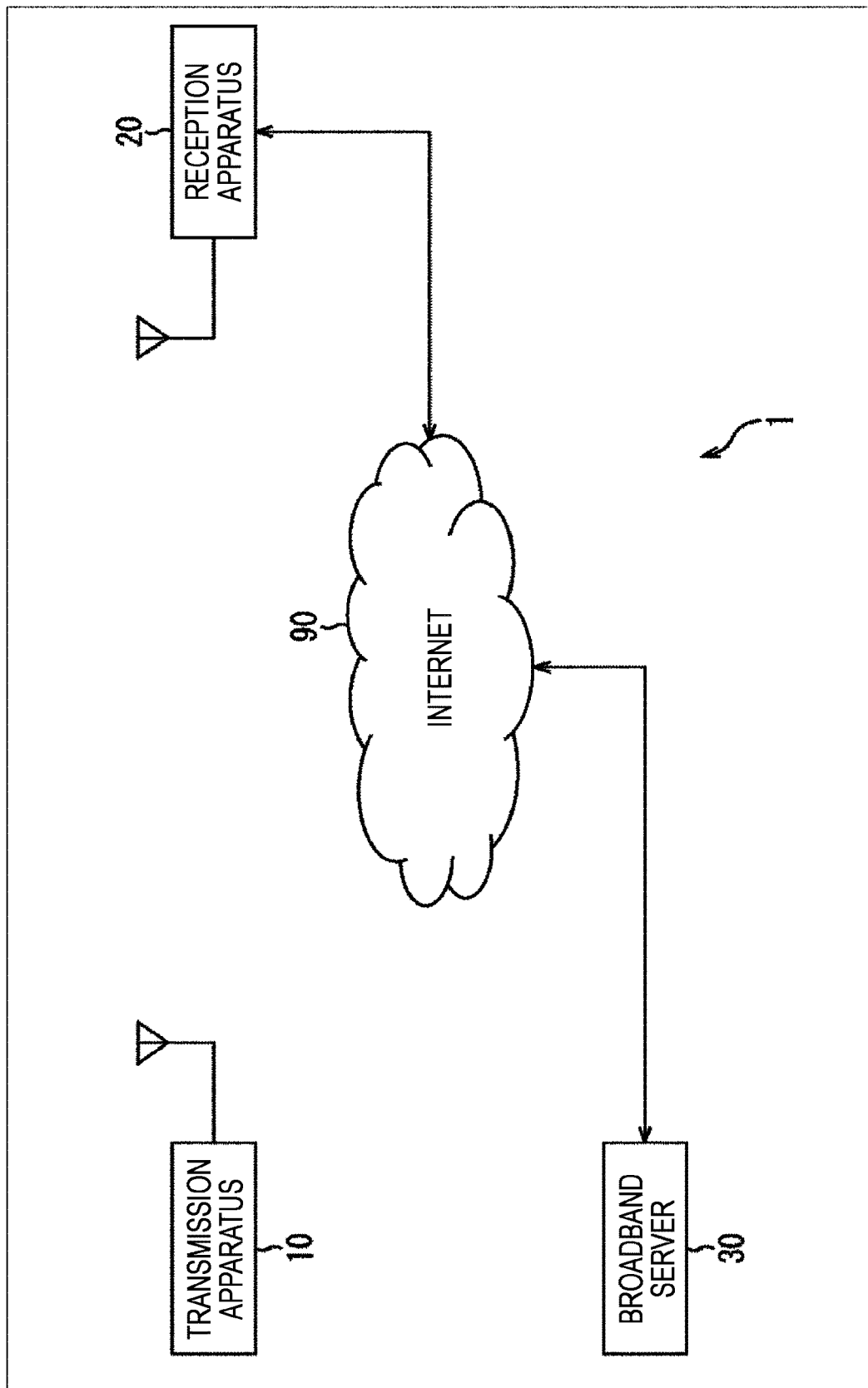
FIG. 1 is a figure illustrating a configuration example of a service providing system.

Hereinafter, an embodiment of the present technique will be explained with reference to drawings. It should be noted that the explanation will be given in the following order.
1. Configuration of system
2. Overview of digital broadcast according to IP transmission method
3. Operation example
(1) Operation example 1: basic service
(2) Operation example 2: multi-BBP stream service
(3) Operation example 3: hybrid service 1
(4) Operation example 4: hybrid service 2
(5) Operation example 5: layer-coded service (enhanced class)
(6) Operation example 6: layer-coded service (core class)
4. Example of syntax
5. Configuration of each apparatus constituting system
6. Flow of processing executed in each apparatus
7. Modification
8. Configuration of computer

1. CONFIGURATION OF SYSTEM (Configuration Example of Service Providing System)

In FIG. 1, a service providing system 1 is a system for providing services such as programs. The service providing system 1 includes a transmission apparatus 10, a reception apparatus 20, and a broadband server 30. In FIG. 1, the reception apparatus 20 is mutually connected to the broadband server 30 via the Internet 90.

The transmission apparatus 10 is, for example, a transmitter supporting a predetermined standard of terrestrial digital television broadcast, and is provided by a broadcast company. In the embodiment of the present technique, for example, a standard such as Advanced Television Systems Committee standards (ATSC) can be employed as the standard of the terrestrial digital television broadcast.

The transmission apparatus 10 transmits a stream of components such as video, audio, and subtitles constituting a service (for example, a program) as well as signaling data by using broadcast waves of digital broadcast.

It should be noted that the signaling data includes two types, i.e., Low Layer Signaling (LLS) signaling data in a low layer not dependent on any service and Service Channel Signaling (SCS) signaling data in units of services, but the detailed contents thereof will be explained later.

The components such as video and audio and the SCS signaling data are transmitted via ROUTE session. ROUTE is made by expanding FLUTE in order to support live services for broadcast. It should be noted that ROUTE may be referred to as FLUTE+(FLUTE plus), FLUTE enhancement, and the like.

In this case, in the ROUTE session, a file to be transmitted and the like may be managed as a single object with a Transport Object Identifier (TOI). A set of multiple objects is managed as a single session with a Transport Session Identifier (TSI). More specifically, in the ROUTE session, a particular file can be designated by two pieces of identification information, i.e., TSI and TOI.

The reception apparatus 20 is a receiver supporting a predetermined standard of terrestrial digital television broadcast such as, e.g., ATSC, and is a fixed receiver such as a television receiver and a set top box, and a mobile receiver such as a smartphone, a cellular phone, a tablet type computer, a notebook type personal computer, a terminal used in an automobile, and the like.

The reception apparatus 20 receives a broadcast wave of digital broadcast transmitted by the transmission apparatus 10, and obtains signaling data transmitted in the broadcast wave of the digital broadcast. The reception apparatus 20 connects to a stream of a service (or a component constituting the service) transmitted in the broadcast wave of the digital broadcast transmitted from the transmission apparatus 10 on the basis of the signaling data, and reproduces (outputs) video and audio obtained from the stream. The reception apparatus 20 has a communication function, and can access the broadband server 30 via the Internet 90.

The broadband server 30 streams and distributes a stream of components such as video, audio, and subtitles constituting a service (for example, a program) via the Internet 90 in response to a request from the reception apparatus 20. The broadband server 30 distributes signaling data via the Internet 90 in response to a request from the reception apparatus 20.

The reception apparatus 20 connects to the stream of the service (or components constituting the service) streamed and distributed from the broadband server 30 via the Internet 90 on the basis of the signaling data from the transmission apparatus 10 or the broadband server 30, and reproduces (outputs) video and audio obtained from the stream.

Although FIG. 1 illustrates a configuration in which the broadcast wave of the digital broadcast from the transmission apparatus 10 is directly received by the reception apparatus 20, the broadcast wave of the digital broadcast may be transmitted via one or more relay stations (not illustrated). In a case where the reception apparatus 20 is a mobile receiver, the reception apparatus 20 connects to the Internet 90 via an access point of a public wireless Local Area Network (LAN), or connects to the broadband server 30 via a mobile network (not illustrated) such as Long Term Evolution (LTE).

In some cases, the reception apparatus 20 may not have any communication function, or the reception apparatus 20 may have a communication function but have the communication function disabled. In the following explanation, as necessary, a reception apparatus 20 having a communication function and supporting hybrid reception of broadcast and communication for which the communication function is enabled will be referred to as a reception apparatus 20A, and a reception apparatus 20 not having any communication function or having a communication function but supporting reception of only the broadcast, e.g., the communication function is disabled, will be referred to as a reception apparatus 20B, so that they are distinguished from each other.

2. OVERVIEW OF DIGITAL BROADCAST ACCORDING TO IP TRANSMISSION METHOD

In digital broadcast standards in various countries, MPEG2-TS method is employed as a transmission method, but in the future, it is expected to introduce IP transmission method using IP packets used in the field of communication for digital broadcast, so that more advanced services are provided. In particular, ATSC 3.0 which is a next generation broadcast standard in America currently being formulated is expected to employ digital broadcast using the IP transmission method.

In the broadcast wave of the digital broadcast according to the IP transmission method, one or more Base Band Packet (BBP) streams are transmitted in a predetermined frequency band supporting a physical channel (RF Channel). In each BBP stream, streams such as a Low Layer Signaling (LLS) and one or more service channels (services) are transmitted. In the LLS stream, LLS signaling data of the low layer not dependent on any service is transmitted.

The service channel (service) is constituted by a Service Channel Signaling (SCS) and components (Components) of a program such as video, audio, and subtitles. In the SCS stream, the SCS signaling data is transmitted in units of services.

It should be noted that the SCS signaling data and the data of the components are transmitted in the ROUTE session. A common IP address is given to the elements constituting each service. The SCS signaling data, the data of the components, and the like can be packaged for each service by using this IP address.

In this case, for example, for each broadcast company, a broadcast stream ID is allocated to a broadcast wave (RF Channel) constituted by a predetermined frequency band. A BBP stream ID is allocated to one or more BBP streams transmitted with each broadcast wave. Further, a service ID is allocated to one or more services transmitted in each BBP stream.

As described above, a configuration supporting a combination (Triplet) of a network ID used in the MPEG2-TS method, a transport stream ID, and a service ID is employed as the ID system of the IP transmission method, and a BBP stream configuration in the network and a service configuration are shown by this triplet.

By using such ID system, a compatibility with the MPEG2-TS method which is currently widely prevalent can be maintained. In the ID system of the IP transmission method, the broadcast stream ID and the BBP stream ID correspond to the network ID and the transport stream ID, respectively, in the MPEG2-TS method.

In the BBP stream, not only the stream of the LLS and the service channel but also streams of Network Time Protocol (NTP) and Electronic Service Guide (ESG) services may be transmitted. The NTP is time information. The ESG service is an electronic service guide specified by Open Mobile Alliance (OMA).

(Example of Signaling Data)

FIG. 2 is a figure illustrating an example of signaling data.

As described above, the signaling data includes LLS signaling data transmitted in the LLS stream and SCS signaling data transmitted in the SCS stream.

The LLS signaling data is signaling data in a lower layer not dependent on any service, and is transmitted in a lower layer (layer) than an IP layer in the protocol stack of the IP transmission method. For example, the LLS signaling data includes LLS meta data such as Fast Information Channel (FIC); Service Configuration Description (SCD); Emergency Alerting Description (EAD); Region Rating Description (RRD); Default Component Description (DCD).

The SCS signaling data is signaling data in units of services, and is transmitted in an upper layer (layer) than the IP layer in the protocol stack of the IP transmission method. For example, the SCS signaling data includes SCS meta data such as User Service Bundle Description (USBD); User Service Description (USD); Session Description Protocol (SDP); Media Presentation Description (MPD); Initialization Segment (IS); LCT Session Instance Description (LSID); Electric Service Guide Current (ESGc); Service Parameter Description (SPD). It should be noted that the SCS signaling data is transmitted in the ROUTE session.

The FIC includes, e.g., information indicating the BBP stream in the network and the configuration of the services with the ID system corresponding to the MPEG2-TS method. Although the details will be described later, the FIC describes signaling scope information (signaling scope all), SCS shortcut information (SCS_shortcut), hybrid information (hybrid), and class information (class).

The detailed structure of the FIC will be explained with reference to the syntax of the FIC of FIG. 10. In this case, the FIC is explained as being transmitted in the LLS stream, but the FIC may be configured to be transmitted in a lower layer (layer) other than the LLS stream, for example, a physical layer and the like.

The SCD includes information indicating the configuration of the services and the like. It should be noted that the detailed structure of the SCD will be explained later with reference to the syntax of the SCD of FIG. 11. The EAD includes emergency warning information about an emergency warning. The RRD includes information about a rating. The DCD is information required to tune in to a minimum service obtained in advance before the SCS signaling data.

The USBD includes reference information referring to SCS meta data such as MPD, SDP, and the like. The USD includes information and the like for identifying a distribution route of components constituting a service. It should be noted that the USD may be included in the USBD. The SDP is information for connecting to a stream of components transmitted in units of services. The SDP includes a service attribute in a unit of a service, configuration information and an attribute of a stream, filter information, location information, and the like.

The MPD is information for managing reproduction of a stream of components transmitted in units of services. The MPD enumerates multiple components, and includes information about a segment Uniform Resource Locator (URL) indicating the location of acquisition. The IS is an initialization segment for a media segment (MS) in the ROUTE session.

It should be noted that the USBD, the USD, the MPD, the SDP, and the IS are considered to refer to any one of the standards made by any one of Third Generation Partnership Project (3GPP); Moving Picture Expert Group (MPEG); and Internet Engineering Task Force (IETF).

The LSID is obtained by expanding a File Delivery Table (FDT) of FLUTE for real time service, and is management information about a stream of components transmitted for each of the ROUTE sessions. It should be noted that the LSID may be configured to be transmitted via a ROUTE session different from other SCS meta data.

The ESGc is current information about the ESG, and is to transmit information about a program that is currently being broadcast. It should be noted that the ESG is standardized by Open Mobile Alliance (OMA). The SPD defines a parameter of a service level.

In the LLS signaling data, the FIC is data in a binary format, but the LLS meta data such as the SCD except the FIC is data in a text format. In the SCS signaling data, all the SCS meta data is data in a text format. For example, the LLS meta data such as the SCD and the SCS meta data can be described with a markup language such as Extensible Markup Language (XML).

(Detailed Content of FIC)

Subsequently, detailed contents of signaling scope information, SCS shortcut information, hybrid information, and class information described in the FIC will be explained.

(Signaling Scope Information)

The signaling scope information (signaling scope all) indicates a reference range of the SCS signaling data distributed via broadcast. For example, in a case where the SCS signaling data distributed via broadcast describes information (meta data) about the stream of all the components constituting the service, "TRUE" is designated as the signaling scope information.

In a case where the SCS signaling data distributed via broadcast describes only the information (meta data) about the stream of components constituting the service and distributed via broadcast, "FALSE" is designated as signaling scope information. For example, in a case where the stream of components constituting the service is distributed via broadcast and via communication (hybrid distribution), and a case where the SCS signaling data distributed via broadcast describes only the information about the stream of components distributed via broadcast, "FALSE" is designated as the signaling scope information.

(SCS Shortcut Information)

The SCS shortcut information (SCS_shortcut) indicates whether the service described in the FIC is a basic service or a rich service. For example, in the case of the basic service, "TRUE" is designated as the SCS shortcut information, and in the case of the rich service, "FALSE" is designated as the SCS shortcut information In this case, the basic service is a service in which the stream of components constituting the service can be individually identified according to a MIME type. The rich service is a service other than the basic service . For example, the rich service corresponds to a service in which any one of the components of video, audio, and subtitle is constituted by two or more streams.

In a case where the SCS shortcut information indicates the basic service, the reception apparatus 20 obtains the MPD and the LSID in the SCS signaling data, so that the reception apparatus 20 can connect to the stream of components to start rendering processing. In this case, the transmission apparatus 10 does not need to transmit all of the SCS signaling data. Therefore, from the view point of a company (for example, broadcast company) providing services, there is an advantage in that, e.g., the service operation is simplified, and the broadcast band can be effectively used.

(Hybrid Information)

The hybrid information (hybrid) indicates whether the stream of components constituting the service described in the FIC is distributed only via the broadcast (broadcast distribution) or distributed via broadcast and via communication (hybrid distribution). For example, in the case of the hybrid distribution, "TRUE" is designated as the hybrid information, and in the case of the broadcast distribution, "FALSE" is designated as the hybrid information.

(Relationship of Information Described in the FIC)

When the relationship of information described in the FIC is summarized, the relationship is as shown in FIG. 3. Although the details will be described with reference to the syntax of FIG. 10, the FIC has the signaling scope information described in signalingscopeall, and the SCS shortcut information is described in SCS_shortcut, and the hybrid information is described in hybrid.

In FIG. 3, in a case where "FALSE" is designated as signaling scope information (signaling scope all), the SCS signaling data distributed via broadcast describes only the information (meta data) about the stream of components distributed via broadcast.

In this case, when "TRUE" is designated as the SCS shortcut information (SCS_shortcut) and "FALSE" is designated as the hybrid information (hybrid), this will be called "case A". In this case A, the stream of components constituting the basic service is distributed by the broadcast distribution. In the case A., the reception apparatus 20A supporting the hybrid reception of both of the broadcast and the communication and the reception apparatus 20B supporting reception of only the broadcast obtain the LSID and the MPD, so that the reception apparatus 20A and the reception apparatus 20B can connect to the stream of components distributed via broadcast, and can start the rendering processing.

Subsequently, when "TRUE" is designated as the SCS shortcut information, and "TRUE" is designated as the hybrid information, this will be called "case B". In this case B, the stream of components distributed via broadcast constituting the basic service and the stream of other components distributed via the communication constitute the hybrid service and are distributed by the hybrid distribution. Then, in the case B, the reception apparatus 20A needs to obtain all the SCS signaling data in order to start the rendering processing.

More specifically, in the case B, "TRUE" is designated as the hybrid information, and the stream of components constituting the hybrid service is distributed via the broadcast and via the communication (hybrid distribution), but "FALSE" is designated as the signaling scope information, and the SCS signaling data distributed via the broadcast describes only the information about the stream of components distributed via broadcast.

Therefore, in order to support the hybrid distribution, the reception apparatus 20A needs to obtain the SCS signaling data describing information about the stream of components distributed via the communication. In this case, the reception apparatus 20A accesses the broadband server 30 via the Internet 90 by referring to the SCS broadband location information of the SCD (uri attribute of SignalingOverInternet element), and obtains the SCS signaling data distributed via the communication.

Accordingly, the reception apparatus 20A obtains the SCS signaling data distributed via the broadcast and the SCS signaling data distributed via the communication, so that all the SCS signaling data for starting the rendering processing is completed. As described above, a portion of the SCS signaling data for starting the rendering processing is distributed via the communication, so that the amount of data of the SCS signaling data distributed via the broadcast can be reduced, and therefore, as compared with the case where all the SCS signaling data is distributed via the broadcast, the broadcast band can be reduced.

In the case B, the reception apparatus 20B does not support the hybrid distribution, and therefore, it is not necessary to obtain the SCS signaling data describing information about the stream of components distributed via the communication. Therefore, the reception apparatus 20B can start the rendering processing by obtaining the LSID and the MPD.

Subsequently, when "FALSE" is designated as the SCS shortcut information, and "FALSE" is designated as the hybrid information, this will be called "case C". In this case C, the stream of components constituting the rich service is distributed by the broadcast distribution. Then, in the case C, the reception apparatus 20A and the reception apparatus 20B can start rendering processing by obtaining all the SCS signaling data and connecting to the stream of components distributed via broadcast.

Subsequently, when "FALSE" is designated as the SCS shortcut information and "TRUE is designated as the hybrid information, this will be called "case D". In this case D, the stream of components constituting the rich service is distributed by the hybrid distribution. Then, in the case D, the reception apparatus 20A and the reception apparatus 20B need to obtain all the SCS signaling data in order to start the rendering processing.

However, in the case D, like the case B, the reception apparatus 20A needs to obtain the SCS signaling data describing information about the stream of components distributed via the communication in the stream of components distributed by the hybrid distribution. The reception apparatus 20A accesses the broadband server 30 by referring to the SCS broadband location information of the SCD (uri attribute of SignalingOverinternet element), and obtains the SCS signaling data distributed via the communication.

Therefore, the reception apparatus 20A obtains the SCS signaling data distributed via the broadcast and the SCS signaling data distributed via the communication, thus completing all the SCS signaling data for starting the rendering processing. As described above, a portion of the SCS signaling data for starting the rendering processing is distributed via the communication, so that the amount of data of the SCS signaling data distributed via the broadcast can be reduced. As a result, the broadcast band can be reduced.

On the other hand, in a case where "TRUE" is designated as the signaling scope information, the SCS signaling data distributed via the broadcast describes information (meta data) about the stream of all the components constituting the service.

In this case, when "TRUE" is designated as the SCS shortcut information and "FALSE" is designated as the hybrid information, this will be called "case E". In this case E, the stream of components constituting the basic service is distributed by the broadcast distribution. Then, in the case E, the reception apparatus 20A and the reception apparatus 20B obtain the LSID and the MPD, so that the reception apparatus 20A and the reception apparatus 20B can connect to the stream of components distributed via broadcast, and can start the rendering processing.

Subsequently, when "TRUE" is designated as the SCS shortcut information and "TRUE" is designated as the hybrid information, this will be called "case F". In this case F, the stream of components distributed via broadcast and constituting the basic service and the stream of other components distributed via the communication constitute the hybrid service, so that the hybrid distribution is performed. Then in the case F, the stream of components constituting the hybrid service is distributed by the hybrid distribution, and therefore, the reception apparatus 20A needs to obtain all the SCS signaling data in order to start the rendering processing, but since the SCS signaling data distributed via the broadcast describes information about the stream of all the components constituting the basic service, it is not necessary to obtain the SCS signaling data distributed via the communication.

In the case F, the reception apparatus 20B does not support the hybrid distribution, and therefore, it is not necessary to obtain the SCS signaling data describing information about the stream of components distributed via the communication. Therefore, the reception apparatus 20B obtains the LSID and the MPD, so that the reception apparatus 20B can start the rendering processing.

Subsequently, when "FALSE" is designated as the SCS shortcut information and "FALSE" is designated as the hybrid information, this will be called "case G". In this case G, the stream of components constituting the rich service is distributed by the broadcast distribution. Then in the case G, the reception apparatus 20A and the reception apparatus 20B obtain all the SCS signaling data, so that the reception apparatus 20A and the reception apparatus 20B can connect to the stream of components distributed via broadcast, and can start the rendering processing.

Subsequently, when "FALSE" is designated as the SCS shortcut information and "TRUE" is designated as the hybrid information, this will be called "case H". In this case H, the stream of components constituting the rich service is distributed by the hybrid distribution. Then, in the case H, the reception apparatus 20A and the reception apparatus 20B need to obtain all the SCS signaling data in order to start the rendering processing.

However, in the case H, the stream of components constituting the rich service is distributed by the hybrid distribution, and there fore, the reception apparatus 20A needs to obtain all the SCS signaling data in order to start the rendering processing, but the SCS signaling data distributed via the broadcast describes information about the stream of all the components constituting the rich service, it is not necessary to obtain the SCS signaling data distributed via the communication, just like the case F.

As described above, the reception apparatus 20 refers to the signaling scope information, the SCS shortcut information, and the hybrid information described in the FIC, so that the reception apparatus 20 can efficiently connect to the stream of components distributed via the broadcast or via the communication, and can efficiently, appropriately, and easily obtain video data, audio data, subtitle data, and the like constituting the desired service.

In accordance with a distribution mode (for example, the broadcast distribution and the hybrid distribution) of the stream of components constituting the service, the SCS signaling data can be distributed efficiently via the broadcast or via the communication, and therefore, the broadcast band used for distribution (transmission) of the SCS signaling data can be minimized to as little as possible.

Further, in accordance with the type of the reception function (performance), the reception apparatus 20 is divided into the reception apparatus 20A supporting the hybrid reception of the broadcast and the communication and the reception apparatus 20B supporting reception of only the broadcast, but information indicating which SCS signaling data is to be obtained can be notified for each type of reception function (performance) in accordance with the signaling scope information and the like described in the FIC.

(Class Information)

In the FIC, class information (class) is described. The class information is used to provide services in different classes so that a single service is provided to multiple different targets. For example, the same service (for example, a program) is considered to be distributed with video and audio in 2K resolution (a resolution of about 2000 horizontal pixels by 1000 vertical pixels) having a high level of robustness for a mobile receiver in an unstable reception environment, and is considered to be distributed with video in 4K resolution (a resolution of about 4000 horizontal pixels by 2000 vertical pixels) and high quality audio having a low robustness performance for a fixed receiver in a stable reception environment.

For example, a layered coding of a video stream is known as a providing method of this kind of service. In the layered coding, a video stream is divided into two or more layers, and a single high quality video can be generated by joining the layers. For example, a low quality video stream can be distributed as a base layer, and supplemental information (information for improving, for example, a resolution, a frame rate, an image quality, and the like) for strengthening the video stream serving as the base layer can be distributed as an enhancement layer. Therefore, the reception apparatus 20 not only receives a low quality video corresponding to the base layer (for example, a video having 2K resolution) but also can reproduce a high quality video (for example, video having 4K resolution) obtained by joining the base layer and the enhancement layer.

In the following explanation, class information for providing the base layer will be referred to as a "core class", and class information for providing the enhancement layer will be referred to as an "enhanced class". More specifically, two kinds of class information, i.e., the core class and the enhanced class, are provided as the class information, so that the layered coding of the video stream is realized.

Encryption information (sp_indicator) indicating whether a video stream is encrypted or not can be set as a constituent element of the class information. When this encryption information is used, various kinds of service modes can be supported, for example, the video stream of the base layer (base stream) is provided for free without being encrypted, and the video stream of the enhancement layer (enhanced stream) is encrypted and provided at cost. In the class information, SCS bootstrap information is described to connect to a stream of SCS signaling data for each piece of class information such as a core class, an enhanced class, and the like.

As described above, when the class information described in the FIC is used, services in different classes can be provided so that a single service is provided to multiple different targets. For example, a service constituted by a video having 2K resolution having a high level of robustness and audio can be provided to a mobile receiver, i.e., atarget. For example, a service constituted by a 4K resolution video and high quality audio can be provided to a fixed receiver, i.e., a target.

3. OPERATION EXAMPLE (1) Operation Example 1

Basic Service

Figure 4:
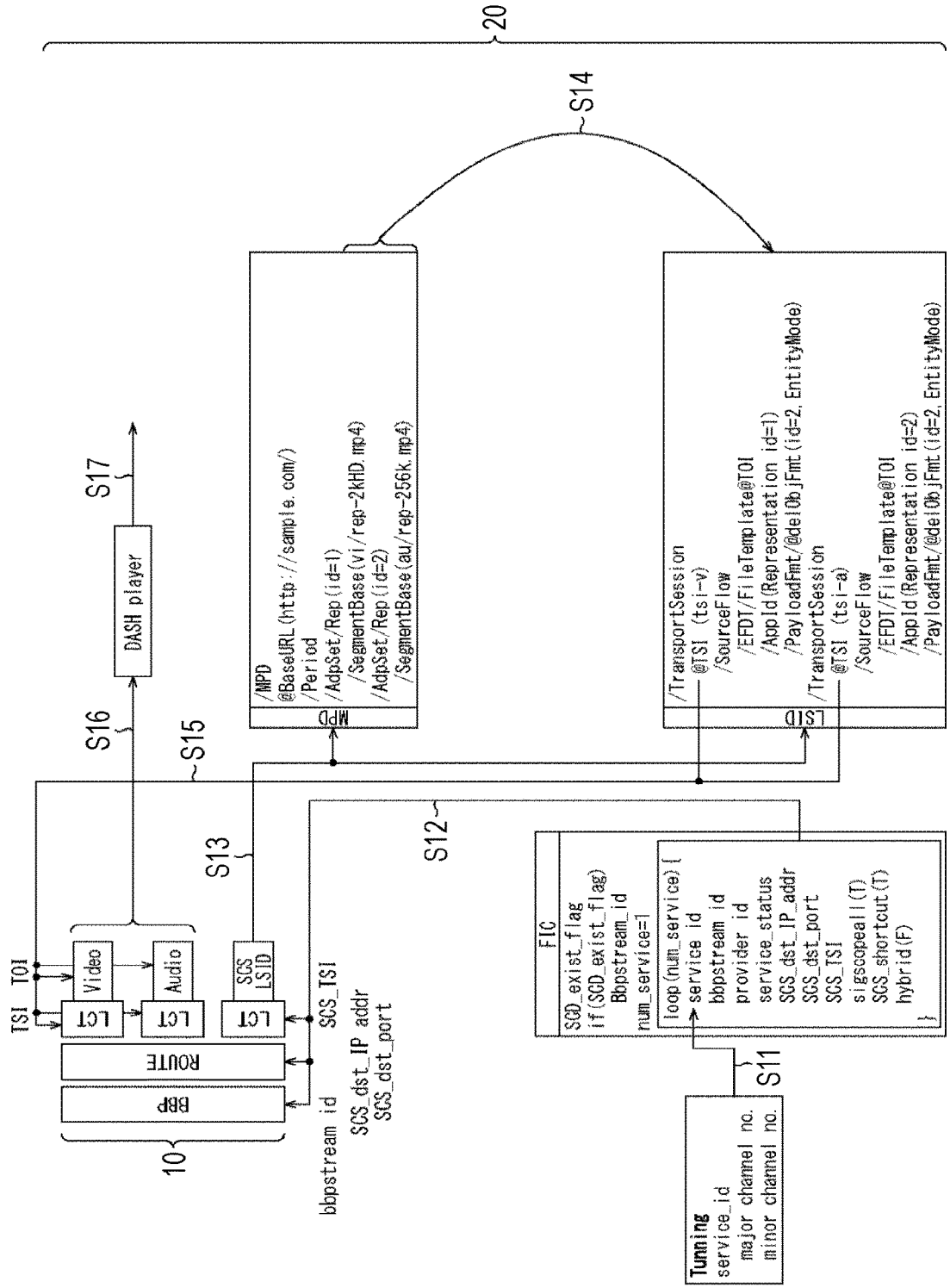
FIG. 4 is a sequence diagram illustrating basic service.

FIG. 4 is a sequence diagram for explaining a specific flow of processing performed with the reception apparatus 20 in a case where the operation example 1 for providing the basic service is employed.

In FIG. 4, the transmission apparatus 10 transmits a broadcast wave of a digital broadcast (RF Channel) using an IP transmission method. In this broadcast wave, streams of components constituting a basic service (for example, a program) and SCS signaling data are transmitted in a BBP stream. However, the components constituting the basic service and the SCS signaling data are transmitted in a ROUTE session in units of LCT packets.

In FIG. 4, in a case where service tuning is performed with user's operation and the like, the reception apparatus 20 reads the FIC recorded in an NVRAM, and obtains tuning information corresponding to a service ID of a service of a tuning target from a loop of the basic service of the FIC (S11). It should be noted that the service tuning (channel tuning) is an operation for selecting a desired service (channel), and, for example, the service tuning is performed by designating the service ID corresponding to the major channel number and the minor channel number.

It should be noted that the FIC is made of a binary format, and is obtained and recorded to the NVRAM during initial scan processing, or in a case where the version information of the FIC transmitted in the LLS stream is updated during service tuning, the latest version of the FIC is obtained and recorded to the NVRAM. In the FIC, the service status information (service_status) is described for each service, and therefore, whether the basic service is provided or not can be found by referring to the service status information of the basic service.

The reception apparatus 20 reads the SCS bootstrap information from the loop of the basic service of the FIC. In this SCS bootstrap information, an IP address, a port number, and a TSI are designated to connect to the stream of the SCS signaling data. Therefore, the reception apparatus 20 can connect to the stream of the SCS signaling data transmitted in the ROUTE session in accordance with the IP address, the port number, and the TSI (S12).

In the FIC of FIG. 4, since "TRUE" is designated in the signaling scope information (signaling scope all), the SCS signaling data distributed via the broadcast describes information about all the components constituting the basic service. When "TRUE" is designated in the SCS shortcut information (SCS_shortcut), and "FALSE" is designated in the hybrid information (hybrid), this indicates that the stream of components constituting the basic service is distributed by the broadcast distribution.

More specifically, the description content of the FIC of FIG. 4 corresponds to the case E of FIG. 3, and when the LSID and the MPD are obtained, a connection can be made with the stream of components distributed via broadcast, and therefore, the reception apparatus 20 obtains (captures) the LSID and the MPD transmitted in the ROUTE session on the basis of the SCS bootstrap information (S13).

In this case, as illustrated in FIG. 4, in the MPD in XML format, a Period element, an AdaptationSet element, and a Representation element are described in the layer structure. The Period element serves as a unit for describing the configuration of a service such as a program. It should be noted that the AdaptationSet element and the Representation element are used for each stream of video, audio, subtitles, and the like, and are configured to be able to describe the attributes of the stream. In the MPD, a URL (segment URL) of each stream is designated by BaseURL attribute.

In the MPD of FIG. 4, "http://sample.com/vi/rep-2kHD.mp4" is designated as the URL of the video stream. "http://sample.com/au/rep-256k.mp4" is designated as the URL of the audio stream.

As illustrated in FIG. 4, in the LSID, a TransportSession element and a SourceFlow element are described in the layer structure. In the TransportSession element, a TSI and the like are designated as session information of LCT transport. The SourceFlow element is a parent element of an EFDT element, an ApplicationIdentifier element, and a PayloadFormat element. The EFDT element is an abbreviation of Extended FDT, and TOI is designated by a TOI attribute of a FileTemplate element as information about the extended FDT. An ID mapped with an application is designated in the ApplicationIdentifier element. In the PayloadFormat element, a payload format of source flow information is designated.

As described above, in the LSID of FIG. 4, the TSI and the TOI of the video and the audio supporting MIME type are described. The MPD and the LSID are associated by a representation ID. More specifically, in the example of FIG. 4, a representation ID "1" is allocated to the video stream, and a representation ID "2" is allocated to the audio stream. Therefore, with these representation IDs, the MPD and the LSID are associated with each other. Then, the reception apparatus 20 identifies the IP address, the port number, the TSI, and the TOI for connecting to the stream of the video and the audio constituting the tuned basic service by referring to the LSID associated with the MPD (S14).

The reception apparatus 20 connects to the stream of the video and the audio transmitted in the ROUTE session in accordance with the IP address, the port number, the TSI, and the TOI identified in the processing of step S14 (S15). Therefore, the reception apparatus 20 obtains the video data and the audio data constituting the basic service (S16). It should be noted that the video data and the audio data are transmitted in the ROUTE session, and therefore, by extracting segment data (media segment) stored in the LCT packet to which the LCT header is added, the data thereof can be obtained.

Then, in the reception apparatus 20, a reproducing processing unit (DASH player) performs rendering processing, so that the video and the audio of the program corresponding to the tuned basic service are reproduced (S17).

As described above, in the operation example 1, in the tuning of the basic service, "TRUE" is designated as the signaling scope information in the FIC, and therefore, the SCS signaling data distributed via the broadcast describes information about all the components constituting the basic service. Since "TRUE" is designated as the SCS shortcut information and "FALSE" is designated as the hybrid information, the stream of components constituting the basic service is distributed by the broadcast distribution.

The reception apparatus 20 refers to the FIC, so that the reception apparatus 20 recognizes the information before obtaining the SCS signaling data, and, for example, can connect to the stream of components constituting the basic service by using the MPD and the LSID without referring to all the SCS signaling data. As a result, the reception apparatus 20 can efficiently, appropriately, and easily obtain the video data and the audio data constituting the basic service.

(2) Operation Example 2

Multi-BBP Stream Service (Robust Audio)

Figure 5:
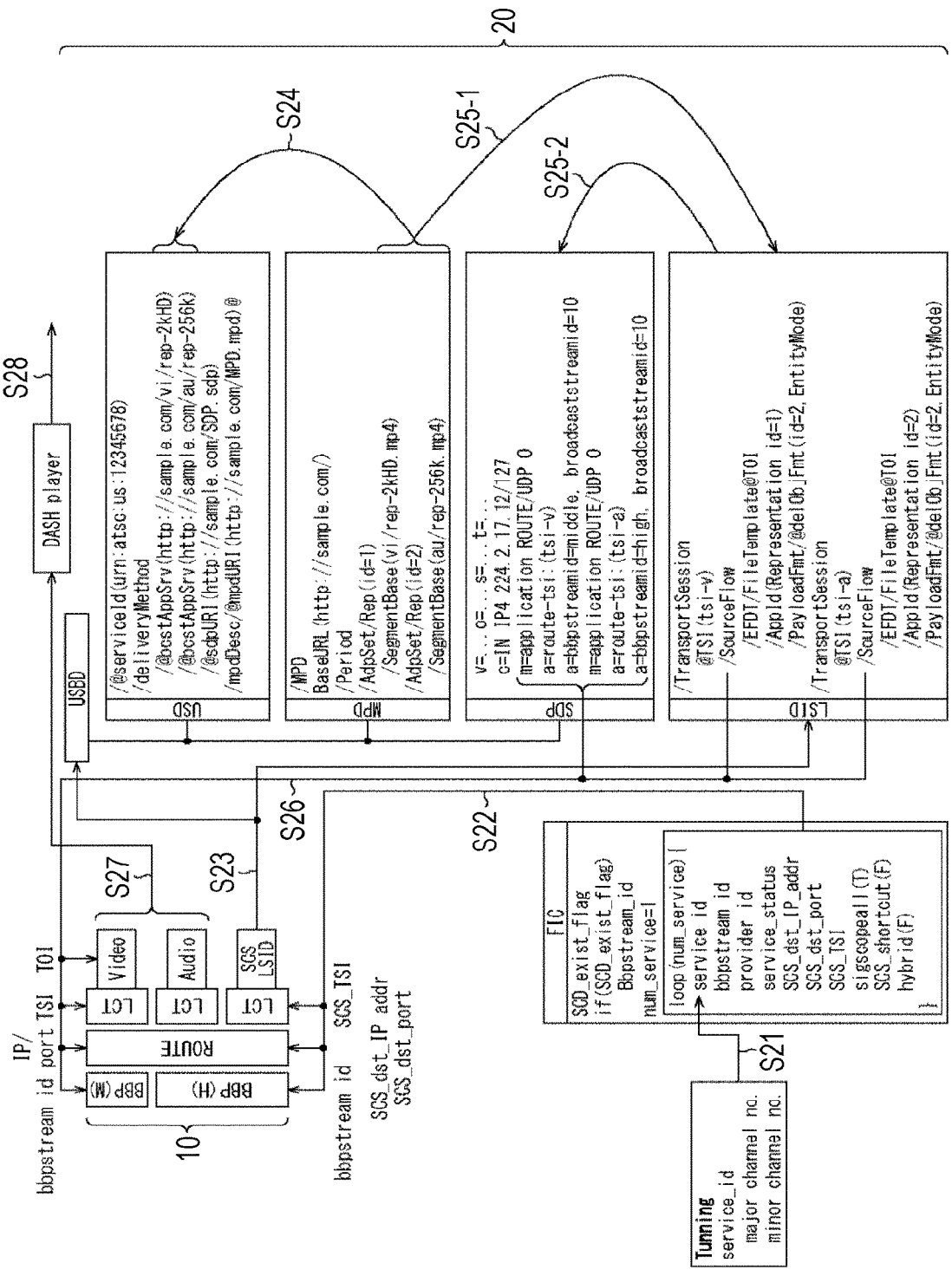
FIG. 5 is a sequence diagram illustrating multi-BBP stream service.

FIG. 5 is a sequence diagram for explaining a specific flow of processing performed with the reception apparatus 20 in a case where the operation example 2 for providing multi-BBP stream service is employed.

In FIG. 5, the transmission apparatus 10 transmits the broadcast wave of the digital broadcast using the IP transmission method. In this broadcast wave, streams of components constituting multi-BBP stream service (for example, a program) and SCS signaling data are transmitted in multiple BBP streams.

However, the video stream and the stream of the audio and the SCS signaling data are transmitted in BBP streams having different levels of robustness. More specifically, the stream of the audio and the SCS signaling data is transmitted in a BBP stream (BBP (H)) having a higher level of robustness than a BBP stream (BBP(M)) in which the video stream is transmitted. The components constituting the multi-BBP stream service and the SCS signaling data are transmitted in the ROUTE session.

In FIG. 5, in a case where service tuning is performed with user's operation and the like, the reception apparatus 20 reads the FIC recorded in the NVRAM, and obtains tuning information corresponding to the service ID of the tuning target service from the loop of the multi-BBP stream service of the FIC (S21). In this case, the reception apparatus 20 reads the SCS bootstrap information from the loop of the multi-BBP stream service of the FIC.

In the FIC of FIG. 5, "TRUE" is designated in the signaling scope information (signaling scope all), and therefore, the SCS signaling data distributed via the broadcast describes information about all the components constituting the multi-BBP stream service. When "FALSE" is designated in the SCS shortcut information (SCS_shortcut) and "FALSE" is designated in the hybrid information (hybrid), this indicates that the stream of components constituting the rich service (multi-BBP stream service) is distributed by the broadcast distribution.

More specifically, the description content of the FIC of FIG. 5 corresponds to the case G of FIG. 3, and in the case of the rich service (multi-BBP stream service), it is necessary to obtain all the SCS signaling data (for example, USED, USD, SDP, MPD, and LSID). Therefore, the reception apparatus 20 connects to the stream of the SCS signaling data transmitted in the ROUTE session on the basis of the SCS bootstrap information (S22), and obtains (captures) all the SCS signaling data (S23).

In this case, as illustrated in FIG. 5, the USD, the MPD, and the SDP are obtained by referring to the USBD. Then, in the MPD, a component which is to be processed in the rendering processing is selected from among the components enumerated in Representation elements in AdaptationSet elements. In the MPD of FIG. 5, a video stream having a URL of "http://sample.com/vi/rep-2kHD.mp4" and an audio stream having a URL of "http://sample.com/au/rep-256k.mp4" are selected.

The reception apparatus 20 compares the URL of the stream of components of the MPD and the URL described in a deliveryMethod element of the USD, so that the reception apparatus 20 determines whether the distribution route of the components is via the broadcast or via the communication (S24). In this case, the video stream having the URL of "http://sample.com/vi/rep-2kHD.mp4" and the audio stream having the URL of "http://sample.com/au/rep-256k.mp4" in the MPD are described in a broadcastAppService element of the deliveryMethod element of the USD, and therefore, the stream of components is determined to be distributed via the broadcast.

The MPD and the LSID are associated by the representation ID, and therefore, the reception apparatus 20 refers to the LSID associated with the MPD, so that the reception apparatus 20 obtains the TSI for connecting to the stream of the video and the audio constituting the tuned multi-BBP stream service (S25-1).

In this case, as illustrated in FIG. 5, the SDP in the text format is constituted by two portions, i.e., a session description unit and a media description unit. The session description unit describes a version of a protocol (protocol version (v)), information about a creator of an SDP description document (origin (o)), a name of a session (session name (s)), an effective time of a session (timing (t)), information about a network address (connection data (c)), and the like.

The media description unit describes media announcement information (media announcements (m)) and the like. In the media announcement information, information such as a media type, a port number, a protocol, a format, and the like is designated. In the media description unit, the function of the SDP can be expanded by designating an attribute type with "a=".

In the SDP of FIG. 5, information about the video stream is described by the first media description unit, and information about the audio stream is described by the second media description unit. More specifically, the video stream is transmitted by the TSI which is "tsi-v" in the ROUTE session. In the video stream, "middle" is designated as the BBP stream ID, and "10" is designated as the broadcast stream ID. On the other hand, the audio stream is transmitted by the TSI which is "tsi-a" in the ROUTE session. In the audio stream, "high" is designated as the BBP stream ID, and "10" is designated as the broadcast stream ID.

The LSID and the SDP are associated by the TSI, and therefore, the reception apparatus 20 compares the TSI serving as the session information about the LSID and the TSI of the media description unit of the SDP, so that the BBP stream ID (and the broadcast stream ID) is identified to connect to the video constituting the tuned multi-BBP stream service and the audio stream (S25-2).

In this case, the TSI which is "tsi-v" in the LSID and the SDP is associated, and therefore, the video stream constituting the multi-BBP stream service is determined to be transmitted in the BBP stream having the BBP stream ID of "middle". Since the TSI which is "tsi-a" in the LSID and the SDP is associated, and therefore, the audio stream constituting the multi-BBP stream service is determined to be transmitted in the BBP stream having the BBP stream ID of "high".

The reception apparatus 20 connects to the video stream transmitted in the ROUTE session in accordance with the BBP stream ID of "middle", the IP address, the port number, the TSI, and the TOI (S26). The reception apparatus 20 connects to the audio stream transmitted in the ROUTE session in accordance with the BBP stream ID of "high", the IP address, the port number, the TSI, and the TOI (S26).

Therefore, the reception apparatus 20 can obtain the video data and the audio data constituting the multi-BBP stream service (S27). Then, in the reception apparatus 20, a reproducing processing unit (DASH player) performs rendering processing, so that the video and the audio (robust audio) of the program supporting the tuned multi-BBP stream service are reproduced (S28).

As described above, in the operation example 2, in the tuning of the multi-BBP stream service, "TRUE" is designated as the signaling scope information in the FIC, and therefore, the SCS signaling data distributed via the broadcast describes information about all the components constituting the multi-BBP stream service. Since "FALSE" is designated as the SCS shortcut information and "FALSE" is designated as the hybrid information, the stream of components constituting the multi-BBP stream service is distributed by the broadcast distribution.

The reception apparatus 20 refers to the FIC, so that the reception apparatus 20 recognizes the information before obtaining the SCS signaling data, and the reception apparatus 20 can connect to the stream of the video and the audio constituting the multi-BBP stream service transmitted in the BBP streams having different levels of robustness by referring to all the SCS signaling data. As a result, the reception apparatus 20 can efficiently, appropriately, and easily obtain the video data and the audio data constituting the multi-BBP stream service.

(3) Operation Example 3

Hybrid Service 1

Figure 6:
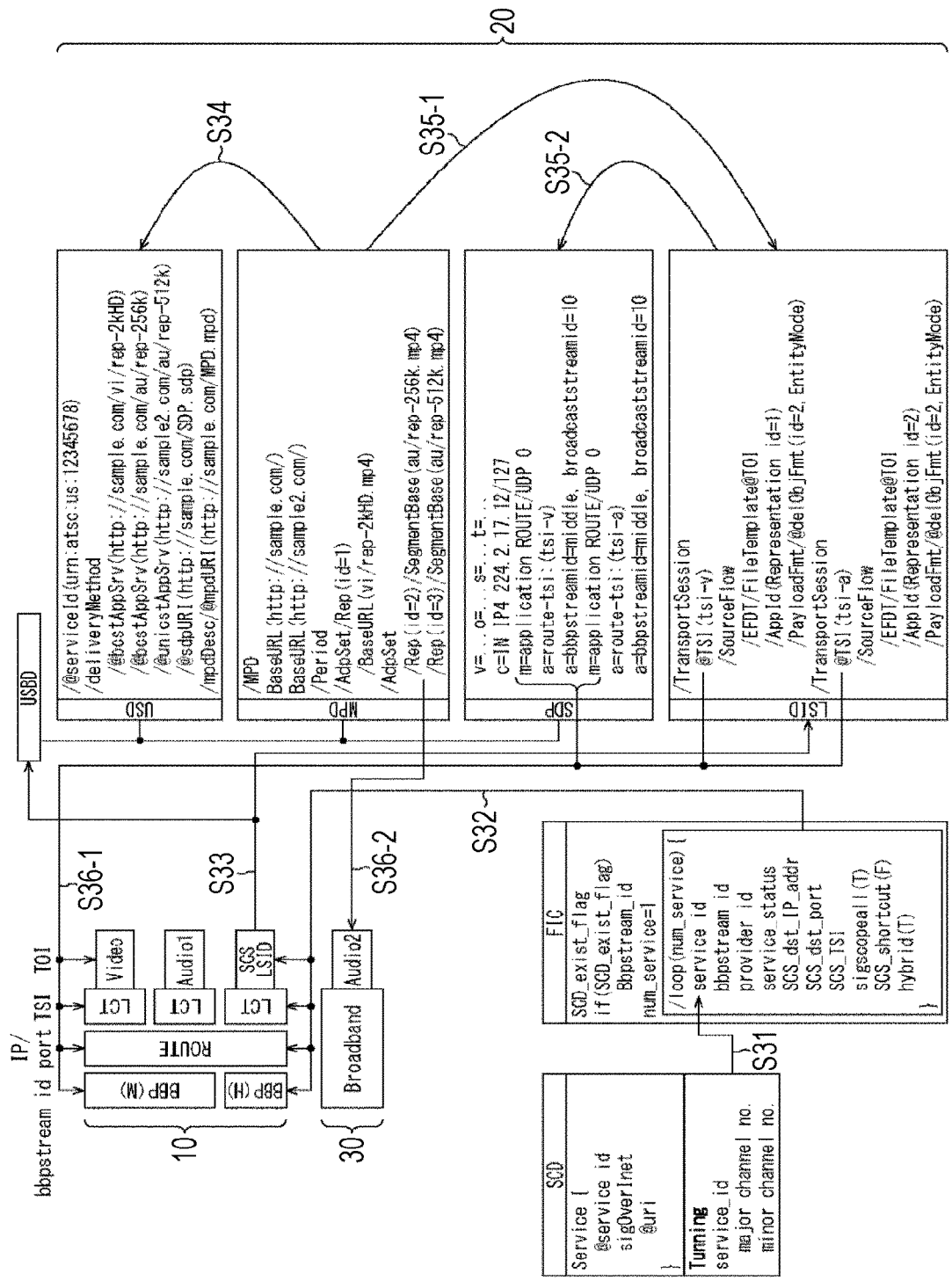
FIG. 6 is a sequence diagram illustrating a hybrid service 1.

FIG. 6 is a sequence diagram for explaining a specific flow of processing performed with the reception apparatus 20 in a case where the operation example 3 for providing a hybrid service 1 is employed.

In FIG. 6, the transmission apparatus 10 transmits the broadcast wave of the digital broadcast using the IP transmission method. In this broadcast wave, streams of components constituting the hybrid service 1 (for example, a program) and SCS signaling data are transmitted in a BBP stream.

However, the stream of the video and the audio 1 and the stream of the SCS signaling data are transmitted in BBP streams having different levels of robustness. More specifically, the stream of the SCS signaling data is transmitted in a BBP stream (BBP(H)) having a higher level of robustness than a BBP stream (BBP (M)) in which the stream of the video and the audio 1 is transmitted. The components constituting the hybrid service 1 and the SCS signaling data are transmitted in the ROUTE session.

In FIG. 6, the broadband server 30 distributes a stream of audio 2 via the Internet 90. It should be noted that the stream of audio 1 distributed via the broadcast and the stream of the audio 2 distributed via the communication have different bit rates (more specifically, the audio 2 has a higher quality).

In FIG. 6, in a case where service tuning is performed with user's operation and the like, the reception apparatus 20 obtains tuning information corresponding to a service ID of a service of the tuning target from the loop of the hybrid service 1 of the FIC by reading the FIC recorded in the NVRAM (S31). In this case, the reception apparatus 20 reads SCS bootstrap information from the loop of the hybrid service 1 of the FIC.

In the FIC of FIG. 6, since "TRUE" is designated as the signaling scope information (signaling scope all), and the SCS signaling data distributed via the broadcast describes information about all the components constituting the hybrid service 1. Since "FALSE" is designated as the SCS shortcut information (SCS_shortcut) and "TRUE" is designated as the hybrid information (hybrid), the stream of components constituting the rich service (hybrid service 1) is distributed by the hybrid distribution. Since "TRUE" is designated as the signaling scope information, it is not necessary to refer to the SCD.

More specifically, the description content of the FIC of FIG. 6 corresponds to the case H of FIG. 3, and in the case of the rich service (hybrid service 1), it is necessary to obtain all the SCS signaling data (for example, USBD, USD, SDP, MPD, and LSID). Therefore, the reception apparatus 20 connects to the stream of the SCS signaling data transmitted in the ROUTE session on the basis of the SCS bootstrap information (S32), and obtains (captures) all the SCS signaling data (S33).

In this case, as illustrated in FIG. 6, the USD, the MPD, and the SDP are obtained by referring to the USBD. In the MPD, a stream of components which are to be processed in the rendering processing is selected from among the streams of components enumerated in Representation elements in AdaptationSet elements. In the MPD of FIG. 6, a video stream having a URL of "http://sample.com/vi/rep-2kHD.mp4" and an audio stream having a URL of "http://sample.com/au/rep-512k.mp4" are selected.

The reception apparatus 20 compares the URL of the stream of components of the MPD and the URL described in the deliveryMethod element of the USD, so that the reception apparatus 20 determines whether the distribution route of the components is via the broadcast or via the communication (S34).

In this case, the video stream having the URL of "http://sample.com/vi/rep-2kHD.mp4" in the MPD is described in the broadcastAppService element of the deliveryMethod element of the USD, and therefore, the distribution route of the components is determined to be via the broadcast. The audio stream of the URL of "http://sample.com/au/rep-512k.mp4" in the MPD is described in the unicastAppService element of the deliveryMethod element of the USD, and therefore, the distribution route of the components is determined to be via the communication.

Since the MPD and the LSID are associated by the representation ID, the reception apparatus 20 obtains the session information (TSI) for connecting to the stream of the video and the audio constituting the tuned hybrid service 1 by referring to the LSID associated with the MPD (S35-1). Further, the LSID and the SDP are associated by the TSI, and therefore, the reception apparatus 20 compares the TSI serving as the session information about the LSID and the TSI of the media description unit of the SDP, so that the BBP stream ID (and the broadcast stream ID) is identified to connect to the stream of the video and the audio constituting the hybrid service 1 (S35-2). Although not illustrated in the drawings, in a case where a stream of components provided in a frequency band different from a frequency in which the SCS signaling data is transmitted is designated, the broadcast stream ID is also identified by the SDP.

In this case, the TSI which is "tsi-v" in the LSID and the SDP is associated, and therefore, the video stream constituting the hybrid service 1 is determined to be transmitted in the BBP stream having the BBP stream ID of "middle". Since the TSI which is "tsi-a" in the LSID and the SDP is associated, the audio stream constituting the hybrid service 1 is determined to be transmitted in the BBP stream having the BBP stream ID of "middle".

The reception apparatus 20 connects to the video stream transmitted in the ROUTE session in accordance with the BBP stream ID of "middle", the IP address, the port number, the TSI, and the TOI (S36-1). The reception apparatus 20 accesses the broadband server 30 via the Internet 90 in accordance with the URL of the audio stream of the MPD ("http://sample.com/au/rep-512k.mp4"), and connects to the stream of the audio 2 (S36-2).

Therefore, the reception apparatus 20 can obtain the video data and the audio data constituting the hybrid service 1. Then, in the reception apparatus 20, a reproducing processing unit (DASH player) performs rendering processing, so that the video and the audio of the program supporting the tuned hybrid service 1 are reproduced.

As described above, in the operation example 3, in the tuning of the hybrid service 1, "TRUE" is designated as the signaling scope information in the FIC, and therefore, the SCS signaling data distributed via the broadcast describes information about all the components constituting the hybrid service 1. Since "FALSE" is designated as the SCS shortcut information and "TRUE" is designated as the hybrid information, the stream of components constituting the hybrid service 1 is distributed by the hybrid distribution.

The reception apparatus 20 refers to the FIC, so that the reception apparatus 20 recognizes the information before obtaining the SCS signaling data, and the reception apparatus 20 can connect to the video stream distributed via the broadcast and the stream of the audio 2 distributed via the communication by referring to all the SCS signaling data obtained via the broadcast. As a result, the reception apparatus 20 can efficiently, appropriately, and easily obtain the video data and the audio data constituting the hybrid service 1.

(4) Operation Example 4

Hybrid Service 2

Figure 7:
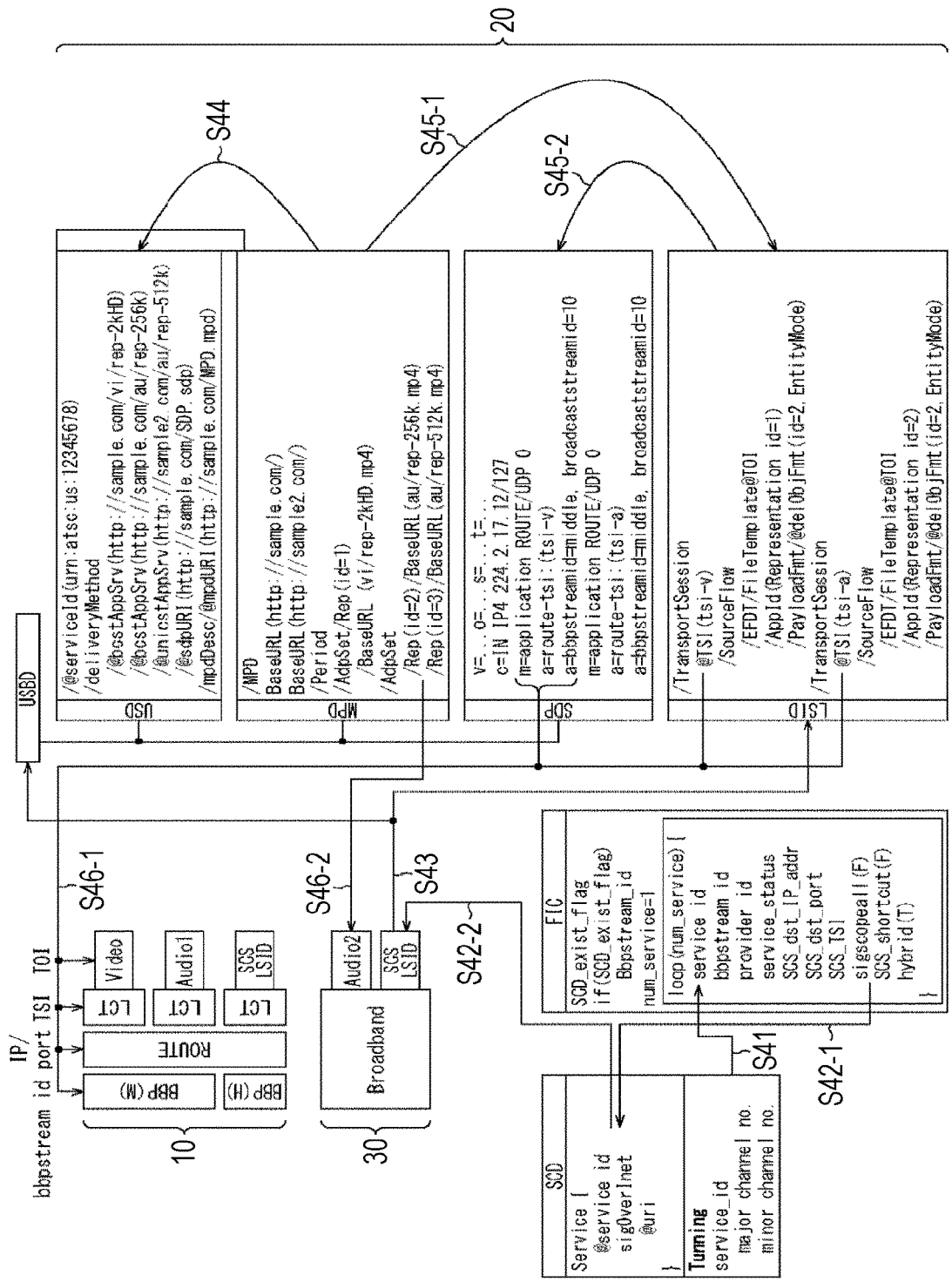
FIG. 7 is a sequence diagram illustrating a hybrid service 2.

FIG. 7 a sequence diagram for explaining a specific flow of processing performed with the reception apparatus 20 in a case where the operation example 4 for providing the hybrid service 2 is employed.

In FIG. 7, the transmission apparatus 10 transmits the broadcast wave of the digital broadcast using the IP transmission method. In this broadcast wave, the components constituting the hybrid service 2 (for example, a program) and the stream of the SCS signaling data are transmitted in the BBP stream.

However, the stream of the video and the audio 1 and the stream of the SCS signaling data are transmitted in BBP streams having different levels of robustness. More specifically, the stream of the SCS signaling data is transmitted in a BBP stream (BBP(H)) having a higher level of robustness than a BBP stream (BBP (M)) in which the stream of the video and the audio 1 is transmitted. It should be noted that the components constituting the hybrid service 2 and the SCS signaling data are transmitted in the ROUTE session.

In FIG. 7, the broadband server 30 distributes the audio 2 and the stream of the SCS signaling data via the Internet 90. It should be noted that the stream of the audio 2 distributed via the communication has a higher quality than the stream of audio 1 distributed via the broadcast.

In FIG. 7, in a case where service tuning is performed with user's operation and the like, the reception apparatus 20 obtains tuning information corresponding to a service ID of a service of the tuning target from the loop of the hybrid service 2 of the FIC by reading the FIC recorded in the NVRAM (S41). In this case, the reception apparatus 20 reads the SCS bootstrap information from the loop of the hybrid service 2 of the FIC.

In the FIC of FIG. 7, "FALSE" is designated as signaling scope information (signaling scope all), and therefore, the SCS signaling data distributed via the broadcast describes only the information about the stream of components distributed via broadcast from among the stream of components constituting the hybrid service 2. When "FALSE" is designated as the SCS shortcut information (SCS_shortcut) and "TRUE" is designated as the hybrid information (hybrid), this indicates that the stream of components constituting the rich service (hybrid service 2) is distributed by the hybrid distribution.

More specifically, the description content of the FIC of FIG. 7 corresponds to the case D of FIG. 3, and in the case of the rich service (hybrid service 2), it is necessary to obtain all the SCS signaling data (for example, USED, USD, SDP, MPD, and LSID). Therefore, the reception apparatus 20 refers to the SCS broadband location information of the SCD (uri attribute of SignalingOverinternet element), so that the reception apparatus 20 accesses the broadband server 30 via the Internet 90, and obtains the SCS signaling data via the communication (S42-1, S42-2).

In this case, only the SCS signaling data distributed via the communication has been explained in order to simplify the explanation, but in reality, when the SCS signaling data distributed via the broadcast is obtained in accordance with the SCS bootstrap information arranged in the loop of the hybrid service 2 of the FIC, all the SCS signaling data for starting the rendering processing is completed. However, all the SCS signaling data for starting the rendering processing may be configured to be completed with only the SCS signaling data distributed via the communication without using the SCS signaling data distributed via the broadcast.

In this case, as illustrated in FIG. 7, the USD, the MPD, and the SDP are obtained by referring to the USBD. Then, in the MPD, a stream of components which are to be processed in the rendering processing is selected from among the streams of components enumerated in Representation elements in AdaptationSet elements. In the MPD of FIG. 7, a video stream having a URL of "http://sample.com/vi/rep-2kHD.mp4" and an audio stream having a URL of "http://sample.com/au/rep-512k.mp4" are selected.

The reception apparatus 20 compares the URL of the stream of components of the MPD and the URL described in the deliveryMethod element of the USD, so that the reception apparatus 20 determines whether the distribution route of the components is via the broadcast or via the communication (S44).

In this case, the video stream having the URL of "http://sample.com/vi/rep-2kHD.mp4" in the MPD is described in the broadcastAppService element of the deliveryMethod element of the USD, and therefore, the distribution route of the components is determined to be distributed via the broadcast. The audio stream having the URL of "http://sample.com/au/rep-512k.mp4" in the MPD is described in the unicastAppService element of the deliveryMethod element of the USD, and therefore, the distribution route of the components is determined to be via the communication.

Since the MPD and the LSID are associated by the representation ID, the reception apparatus 20 obtains the session information (TSI) for connecting to the stream of the video and the audio constituting the tuned hybrid service 2 by referring to the LSID associated with the MPD (S45-1). Further, the LSID and the SDP are associated by the TSI, and therefore, the reception apparatus 20 compares the TSI serving as the session information about the LSID and the TSI of the media description unit of the SDP, so that the BBP stream ID (and the broadcast stream ID) is identified to connect to the stream of the video and the audio constituting the hybrid service 2 (S45-2).

In this case, the TSI which is "tsi-v" in the LSID and the SDP is associated, and therefore, the video stream constituting the hybrid service 2 is determined to be transmitted in the BBP stream having the BBP stream ID of "middle". The TSI which is "tsi-a" in the LSID and the SDP is associated and the audio stream constituting the hybrid service 2 is determined to be transmitted in the BBP stream having the BBP stream ID of "middle".

The reception apparatus 20 connects to the video stream transmitted in the ROUTE session in accordance with the BBP stream ID of "middle", the IP address, the port number, the TSI, and the TOI (S46-1). The reception apparatus 20 accesses the broadband server 30 via the Internet 90 in accordance with the URL of the audio stream of the MPD ("http://sample.com/au/rep-512k.mp4"), and connects to the stream of the audio 2 (S46-2).

Therefore, the reception apparatus 20 obtains the video data and the audio data constituting the hybrid service 2. Then, in the reception apparatus 20, a reproducing processing unit (DASH player) performs rendering processing, so that the video and the audio of the program supporting the tuned hybrid service 2 is reproduced.

As described above, in the operation example 4, in the tuning of the hybrid service 2, "FALSE" is designated as the signaling scope information in the FIC, and therefore, the SCS signaling data distributed via the broadcast describes only the information about the stream of components distributed via broadcast in the stream of all the components constituting the hybrid service 2. Since "FALSE" is designated as the SCS shortcut information and "TRUE" is designated as the hybrid information, the stream of components constituting the hybrid service 2 is distributed by the hybrid distribution.

The reception apparatus 20 refers to the FIC, so that the reception apparatus 20 recognizes the information before obtaining the SCS signaling data, and the reception apparatus 20 can connect to the video stream distributed via the broadcast and the stream of the audio 2 distributed via the communication by referring to all the SCS signaling data obtained via the broadcast and via the communication. As a result, the reception apparatus 20 can efficiently, appropriately, and easily obtain the video data and the audio data constituting the hybrid service 2.

(5) Operation Example 5

Layer-Coded Service (Enhanced Class)

Figure 8:
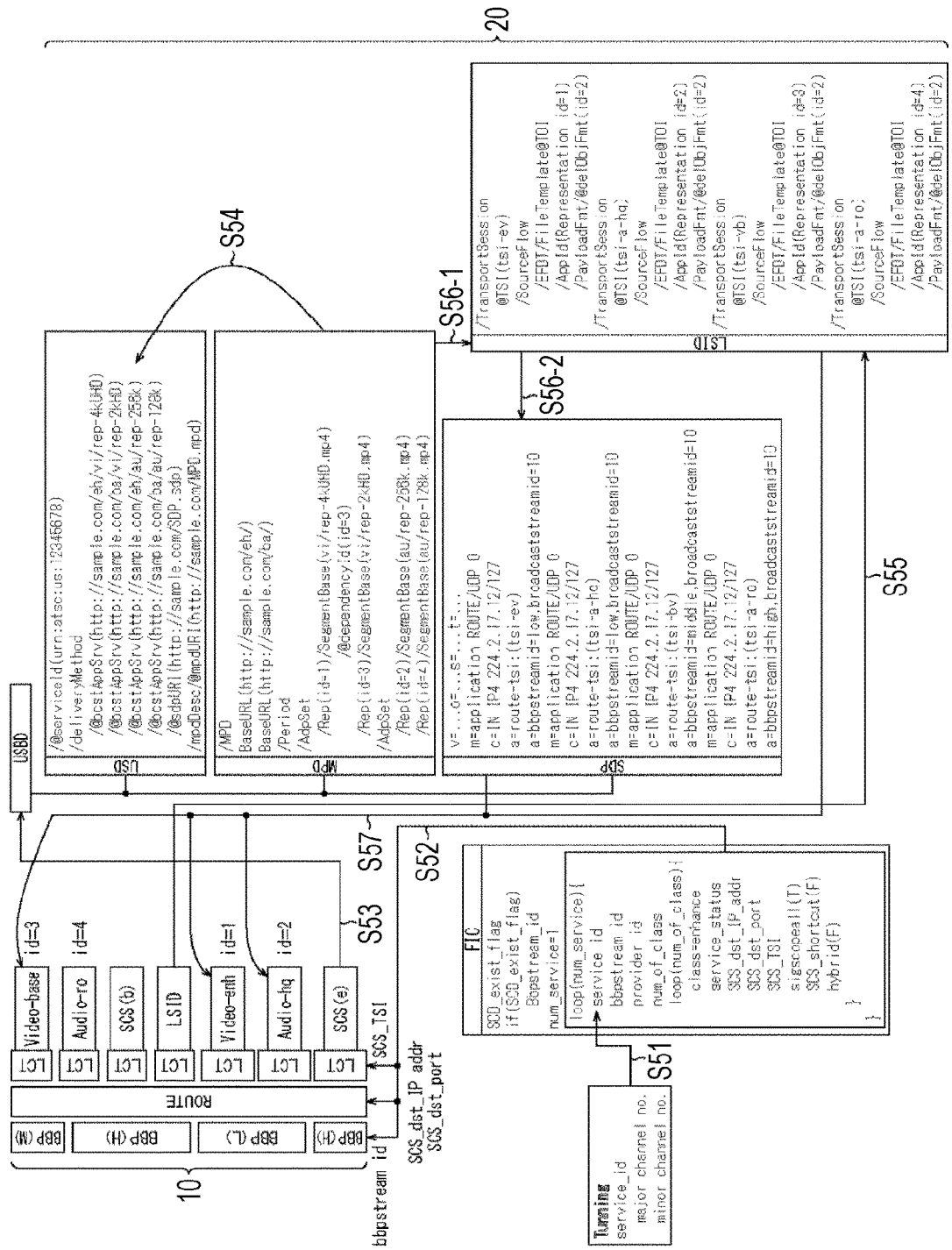
FIG. 8 is a sequence diagram illustrating layer-coded service (enhanced class).

FIG. 8 is a sequence diagram for explaining a specific flow of processing performed with the reception apparatus 20 in a case where the operation example 5 for providing the layer-coded service is employed. However, in the operation example 5, a case where a service of enhanced class (for example, program constituted by video having 4K resolution and high quality audio) is provided as a layer-coded service will be explained.

In FIG. 8, the transmission apparatus 10 transmits the broadcast wave of the digital broadcast using the IP transmission method. In this broadcast wave, the components constituting the layer-coded service and the stream of the SCS signaling data are transmitted in the ROUTE session.

In this case, in the layer-coded service, a stream of video (Video-base) serving as a base layer (hereinafter referred to as "base stream") and a stream of video (Video-enh) serving as an enhancement layer (hereinafter referred to as "enhanced stream") are transmitted. These video streams have dependency, and, for example, in a case where a low quality video (for example, a video having 2K resolution) is reproduced, only the base stream is required, but in a case where a high quality video (for example, a video having 4K resolution) is reproduced, both of the base stream and the enhanced stream are required.

An audio (Audio-ro) stream having high level of robustness (hereinafter referred to as "highly robust audio stream") and a high quality audio (Audio-hq) stream (hereinafter referred to as "high quality stream") are transmitted as audio streams. These audio streams do not have dependency, and any one of the audios is reproduced. Further, SCS signaling data (SCS (b)) for the base layer, SCS signaling data (SCS (e)) for the enhancement layer, and the LSID are transmitted as the SCS signaling data.

In this case, the LSID is common in the same service. More specifically, since the base stream and the enhanced stream are provided as the same layer-coded service, the base stream and the enhanced stream have the same service ID and can be transmitted in the same ROUTE session, and therefore, in this case, the same LSID can be used.

It should be noted that the highly robust audio stream, the streams of the SCS signaling data (SCS(b), SCS(e)), and the stream of the LSID are transmitted in a BBP stream (BBP (H)) having a higher level of robustness (high level of robustness). The enhanced stream and the high quality stream are transmitted in a BBP stream (BBP(L)) having a lower level of robustness (low level of robustness). Further, the base stream is transmitted in a BBP stream (BBP(M)) having a level of robustness between the high level and the low level (intermediate level of robustness).

More specifically, since the highly robust audio stream and the stream of the SCS signaling data are required to be reliably transmitted, the highly robust audio stream and the stream of the SCS signaling data are transmitted in the BBP stream (BBP(H)) having the higher level of robustness. On the other hand, since the enhanced stream and the high quality stream give priority to the quality rather than the robustness, the enhanced stream and the high quality stream are transmitted in the BBP stream (BBP(L)) having the lower level of robustness.

In FIG. 8, in a case where service tuning is performed with user's operation and the like, the reception apparatus 20 obtains tuning information corresponding to a service ID of a service of the tuning target from the loop of the layer-coded service of the FIC by reading the FIC recorded in the NVRAM (S51).

In this case, in the FIC of FIG. 8, the core class and the enhanced class are described as class information (class), and FIG. 8 illustrates a case where the enhanced class is selected. More specifically, in the loop of the enhanced class of the FIC, "enhance" is designated as the class ID, and this indicates that the class information is enhanced class for providing the enhancement layer (and the base layer).

The reception apparatus 20 reads the SCS bootstrap information from the loop of the enhanced class of the FIC. In this SCS bootstrap information, an IP address, a port number, and a TSI are designated to connect to the stream of the SCS signaling data (SCS (e)) for the enhancement layer. The BBP stream ID is designated in the loop of the layer-coded service of the FIC. Therefore, the reception apparatus 20 can connect to the stream of the SCS signaling data (SCS (e)) for the enhancement layer transmitted in the ROUTE session in accordance with the BBP stream ID, the IP address, the port number, and the TSI (S52).

In the FIC, "TRUE" is designated as the signaling scope information (signaling scope all), and therefore, the SCS signaling data distributed via the broadcast describes information about all the components constituting the layer-coded service. Since "FALSE" is designated as the SCS shortcut information (SCS_shortcut) and "FALSE" is designated as the hybrid information (hybrid), the stream of components constituting the layer-coded service (rich service) is distributed by the broadcast distribution. It should be noted that "TRUE" is designated as the signaling scope information, and therefore, it is not necessary to refer to the SCD.

More specifically, the description content of the FIC of FIG. 8 corresponds to the case G of FIG. 3, and in the case of the layer-coded service (rich service), it is necessary to obtain all the SCS signaling data (for example, USED, USD, SDP, MPD, and LSID). Therefore, the reception apparatus 20 obtains (captures) the SCS signaling data (SCS (e)) for the enhancement layer transmitted in the ROUTE session on the basis of the SCS bootstrap information of the enhanced class (S53).

In this case, as illustrated in FIG. 8, the USD, the SDP, and the MPD are obtained by referring to the USED. Then, in the MPD, a component which is to be processed in the rendering processing is selected from among the components enumerated in Representation elements in AdaptationSet elements. In the MPD of FIG. 8, the video stream having the URL of "http://sample.com/vi/rep-4kUHD.mp4"(enhanced stream) and the video stream having the URL of "http://sample.com/vi/rep-2kHD.mp4" (base stream) are described as the video stream.

Then, for the enhanced stream having a representation ID "1", "3" is designated as the dependency ID by dependencyId attribute, and this indicates that the enhanced stream has a dependency with the base stream having the representation ID "3". More specifically, the enhanced stream having a URL of "http://sample.com/vi/rep-4kUHD.mp4" and the base stream having a URL of "http://sample.com/vi/rep-2kHD.mp4", which are in such dependency, are described in the broadcastAppService element of the deliveryMethod element of the USD, and therefore, both of these streams are determined to be distributed via the broadcast (S54).

In the MPD of FIG. 8, an audio stream having a URL of "http://sample.com/au/rep-256k.mp4" (high quality stream) and an audio stream having a URL of "http://sample.com/au/rep-128k.mp4" (highly robust audio stream) are described as the audio streams. A dependency ID is not designated for a high quality stream having a representation ID "2" and a highly robust audio stream having a representation ID "4", and therefore, these streams do not have any dependency.

A high quality stream having a URL of "http://sample-.com/au/rep-256k.mp4" and a highly robust audio stream having a URL of "http://sample.com/au/rep-128k.mp4" are described in the broadcastAppService element of the deliveryMethod element of the USD, and therefore, both of these streams are determined to be distributed via the broadcast (S54).

In this case, the LSID is commonly used in the layer-coded service. The IP address and the port number for connecting to the stream of the LSID are the same as those for the SCS signaling data (SCS (e)), and therefore, the IP address and the port number are obtained from the SCS bootstrap information disposed in the loop of the enhanced class of the FIC. Since the TOI of the LSID is fixed at "0", the reception apparatus 20 connects to the stream of the LSID transmitted in the ROUTE session in accordance with the BBP stream ID, the IP address, the port number, and the TSI, so that the reception apparatus 20 can obtain the LSID (S55).

The MPD and the LSID are associated by the representation ID, and therefore, the reception apparatus 20 refers to the LSID associated with the MPD, so that the reception apparatus 20 obtains the session information (TSI) for connecting to the enhanced stream constituting the layer-coded service, the base stream, and the high quality stream or the highly robust audio stream (S56-1). Further, the LSID and the SDP are associated by the TSI, and therefore, the reception apparatus 20 compares the TSI serving as the session information about the LSID and the TSI of the media description unit of the SDP, so that the BBP stream ID (and the broadcast stream ID) is identified to connect to the enhanced stream constituting the layer-coded service, the base stream, and the high quality stream or the highly robust audio stream (S56-2). Although not illustrated in the drawings, in a case where a stream of components provided in a frequency band different from a frequency in which the SCS signaling data is transmitted is designated, the broadcast stream ID is also identified by the SDP.

In this case, since the TSI which is "tsi-ev" in the LSID and the SDP is associated, the enhanced stream constituting the layer-coded service is determined to be transmitted in the BBP stream having a BBP stream ID of "low". Since the TSI which is "tsi-bv" in the LSID and the SDP is associated, the base stream constituting the layer-coded service is determined to be transmitted in a BBP stream having the BBP stream ID of "middle".

In a case where the high quality stream is selected, the TSI which is "tsi-a-hq" in the LSID and the SDP is associated, and therefore, the high quality stream constituting the layer-coded service is determined to be transmitted in the BBP stream having the BBP stream ID of "low". On the other hand, in a case where the highly robust audio stream is selected, the TSI which is "tsi-a-ro" in the LSID and the SDP is associated, and therefore, the highly robust audio stream constituting the layer-coded service is determined to be transmitted in the BBP stream having the BBP stream ID of "high".

The reception apparatus 20 connects to the enhanced stream transmitted in the ROUTE session in accordance with the BBP stream ID of "low", the IP address, the port number, the TSI, and the TOI (S57). The reception apparatus 20 also connects to the base stream transmitted in the ROUTE session in accordance with the BBP stream ID of "middle", the IP address, the port number, the TSI, and the TOI (S57).

Therefore, the reception apparatus 20 can obtain the video data for reproducing the video provided by the layer-coded service. More specifically, for example, in a case where the video data capable of reproducing the video having 2K resolution is transmitted by the base stream, and supplemental information for enhancing the video having 2K resolution to make the video having 4K resolution is transmitted by the enhancement stream, the reception apparatus 20 uses a reproducing processing unit (DASH player) to perform rendering processing to join the base layer and the enhancement layer, so that the reception apparatus 20 can reproduce the video having 4K resolution.

The reception apparatus 20 connects to the high quality stream transmitted in the ROUTE session in accordance with the BBP stream ID of "low", the IP address, the port number, the TSI, and the TOI (S57). Therefore, for example, the reception apparatus 20 can reproduce the high quality audio supporting the video having 4K resolution. In a case where the highly robust audio is reproduced instead of the high quality audio, a connection can be made with the highly robust audio stream transmitted in the BBP stream having the BBP stream ID of "high".

In the operation example 5 of FIG. 8, in this explanation, the base stream and the enhanced stream are distributed via the broadcast. Alternatively, at least one of the base stream and the enhanced stream may be distributed via the communication. In this case, the reception apparatus 20 accesses the broadband server 30 via the Internet 90 in accordance with the URL of the base stream of the MPD ("http://sample.com/vi/rep-2kHD.mp4") or the URL of the enhanced stream("http://sample.com/vi/rep-4kUHD.mp4"), and connects to the base stream or the enhanced stream. Likewise, at least one of the high quality stream or the highly robust audio stream may be distributed via the communication.

As described above, in the operation example 5, the class information described in the FIC is used, so that a single layer-coded service can be provided to multiple different targets (for example, a mobile receiver and a fixed receiver) in such a manner that respectively different classes (for example, a core class and an enhanced class) are provided, so that various kinds of service modes can be supported. For example, a service constituted by a video having 4K resolution and a high quality audio can be provided to a fixed receiver which is the target.

In the operation example 5, in the tuning of the layer-coded service, "TRUE" is designated as the signaling scope information in the FIC, and therefore, the SCS signaling data distributed via the broadcast describes information about all the components constituting the layer-coded service. Since "FALSE" is designated as the SCS shortcut information and "FALSE" is designated as the hybrid information, the stream of components constituting the layer coding service is distributed by the broadcast distribution.

The reception apparatus 20 refers to the FIC, so that the reception apparatus 20 recognizes the information before obtaining the SCS signaling data, and the reception apparatus 20 can connect to the stream of the video and the audio distributed via the broadcast by referring to all the SCS signaling data obtained via the broadcast. As a result, the reception apparatus 20 can efficiently, appropriately, and easily obtain the video data and the audio data constituting the layer-coded service.

(6) Operation Example 6

Layer-Coded Service (Core Class)

Figure 9:
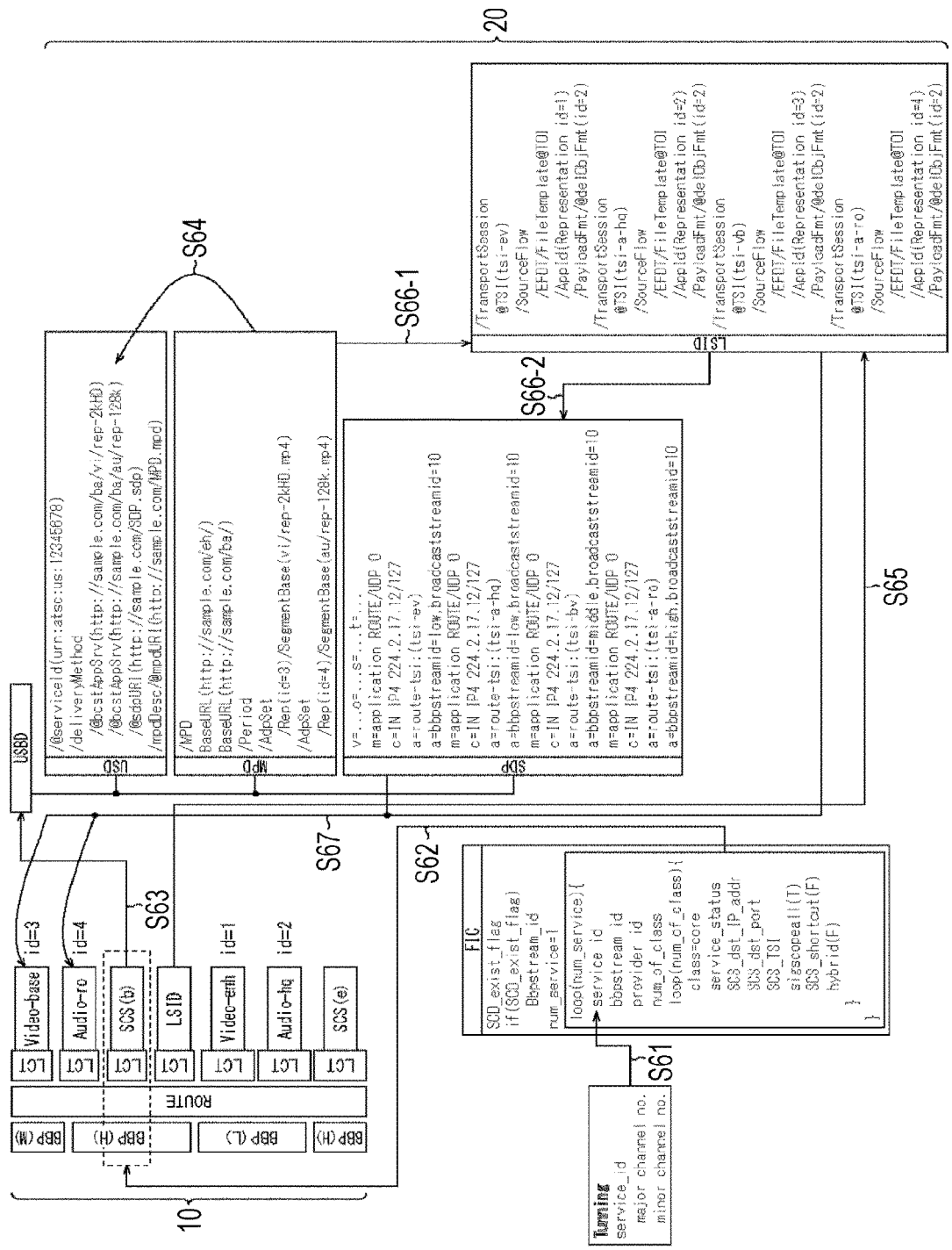
FIG. 9 is a sequence diagram illustrating layer-coded service (core class).

FIG. 9 is a sequence diagram for explaining a specific flow of processing performed with the reception apparatus 20 in a case where the operation example 6 for providing the layer-coded service is employed. However, in the operation example 6, a case where a service of a core class class (for example, a program constituted by a video having 2K resolution and a highly robust audio) is provided as a layer-coded service will be explained.

In FIG. 9, the transmission apparatus 10 transmits the broadcast wave of the digital broadcast using the IP transmission method. In this broadcast wave, like FIG. 8, a highly robust audio stream, a stream of SCS signaling data (SCS (b), SCS(e)), and a stream of LSID are transmitted in a BBP stream (BBP(H)) having a high level of robustness. The enhanced stream and the high quality stream are transmitted in a BBP stream (BBP(L)) having a low level of robustness. Further, the base stream is transmitted in a BBP stream (BBP (M)) having an intermediate level of robustness.

In FIG. 9, in a case where service tuning is performed with user's operation and the like, the reception apparatus 20 obtains tuning information corresponding to a service ID of a service of the tuning target from the loop of the layer-coded service by reading the FIC recorded in the NVRAM (S61).

In this case, in the FIC of FIG. 9, a core class and an enhanced class are described as class information (class), and FIG. 9 illustrates a case where the core class is selected. More specifically, in the loop of the core class of the FIC, "core" is designated as the class ID thereof, and this indicates that the class information is in the core class for providing the base layer.

The reception apparatus 20 reads the SCS bootstrap information from the loop of the core class of the FIC. In this SCS bootstrap information, the IP address, the port number, and the TSI are designated to connect to the stream of the SCS signaling data (SCS (b)) for the base layer. In the loop of the layer-coded service of the FIC, the BBP stream ID is designated. Therefore, the reception apparatus 20 can connect to the stream of the SCS signaling data (SCS (b)) for the base layer transmitted in the ROUTE session in accordance with the BBP stream ID, the IP address, the port number, and the TSI (S62).

In the FIC, "TRUE" is designated as the signaling scope information (signaling scope all), and therefore, the SCS signaling data distributed via the broadcast describes information about all the components constituting the layer-coded service. When "FALSE" is designated as the SCS shortcut information (SCS_shortcut) and " FALSE" is designated as the hybrid information (hybrid), this indicates that the stream of components constituting the layer-coded service (rich service) is distributed by the broadcast distribution. Since "TRUE" is designated as the signaling scope information, it is not necessary to refer to the SCD.

More specifically, the description content of the FIC of FIG. 9 corresponds to the case G of FIG. 3, and in the case of the layer-coded service (rich service), it is necessary to obtain all the SCS signaling data (for example, USED, USD, SDP, MPD, and LSID). Therefore, the reception apparatus 20 obtains (captures) the SCS signaling data (SCS(b)) for the base layer transmitted in the ROUTE session on the basis of the SCS bootstrap information of the core class (S63).

In this case, as illustrated in FIG. 9, the USD, the SDP, and the MPD are obtained by referring to the USBD. Then, in the MPD, a component which is to be processed in the rendering processing is selected from among the components enumerated in Representation elements in AdaptationSet elements. In the MPD of FIG. 9, the video stream having the URL of "http://sample.com/vi/rep-2kHD.mp4" (base stream) and the audio stream having the URL of "http://sample.com/au/rep-128k.mp4" (highly robust audio stream) are described.

More specifically, as compared with the MPD of FIG. 8, the MPD of FIG. 9 describes only the base stream from among the enhanced stream and the base stream, and naturally, the dependency is not designated by a dependency ID. As compared with the MPD of FIG. 8, the MPD of FIG. 9 describes only the highly robust audio stream from among the high quality stream and the highly robust audio stream.

Then, the base stream having the URL of "http://sample.com/vi/rep-2kHD.mp4" and the highly robust audio stream having the URL of "http://sample.com/au/rep-128k.mp4" are described in the broadcastAppService element of the deliveryMethod element of the USD, and therefore, both of these streams are determined to be distributed via the broadcast (S64).

In this case, the LSID is commonly used in the layer-coded service. The IP address and the port number for connecting to the stream of the LSID are like the SCS signaling data (SCS (b)), and therefore, the IP address and the port number are obtained from the SCS bootstrap information disposed in the loop of the core class of the FIC. The TOI of the LSID is fixed to "0", and therefore, the reception apparatus 20 connects to the stream of the LSID transmitted in the ROUTE session in accordance with the BBP stream ID, the IP address, the port number, and the TSI, so that the reception apparatus 20 obtains the LSID (S65).

Then, the MPD and the LSID are associated by the representation ID, and therefore, the reception apparatus 20 obtains the session information (TSI) for connecting to the base stream and the highly robust audio stream from among the elements constituting the layer-coded service by referring to the LSID associated with the MPD (S66-1). In the LSID, the enhanced stream and the session information (TSI) connecting to the high quality stream are described, but in this case, the session information is not required, and is therefore disregarded.

Since the LSID and the SDP are associated by the TSI, the reception apparatus 20 compares the TSI serving as the session information of the LSID and the TSI of the media description unit of the SDP, so that the reception apparatus 20 identifies the BBP stream ID (and the broadcast stream ID) for connecting to the base stream and the highly robust audio stream from among the elements constituting the layer-coded service (S66-2).

In this case, since the TSI which is "tsi-bv" in the LSID and the SDP is associated, the base stream constituting the layer-coded service is determined to be transmitted in the BBP stream having the BBP stream ID of "middle". Since the TSI which is "tsi-a-ro" in the LSID and the SDP is associated, the highly robust audio stream constituting the layer-coded service is determined to be transmitted in the BBP stream having the BBP stream ID of "high".

The reception apparatus 20 connects to the base stream transmitted in the ROUTE session in accordance with the BBP stream ID of "middle", the IP address, the port number, the TSI, and the TOI (S67). The reception apparatus 20 connects to the highly robust audio stream transmitted in the ROUTE session in accordance with the BBP stream ID of "high", the IP address, the port number, the TSI, and the TOI (S67).

Therefore, the reception apparatus 20 can obtain the video data and the audio data constituting the layer-coded service. Then, in the reception apparatus 20, a reproducing processing unit (DASH player) performs rendering processing, so that the video having 2K resolution using the base layer and the highly robust audio corresponding to the video can be reproduced.

In the operation example 6 of FIG. 9, in the explanation, the base stream and the highly robust audio stream are distributed via the broadcast. Alternatively, anyone of the base stream and the highly robust audio stream may be distributed via the communication.

As described above, in the operation example 6, the class information described in the FIC is used, so that a single layer-coded service can be provided to multiple different targets (for example, a mobile receiver and a fixed receiver) in such a manner that respectively different classes (for example, a core class and an enhanced class) are provided, so that various kinds of service modes can be supported. For example, a service constituted by a video having 2K resolution and a highly robust audio can be provided to a mobile receiver which is the target.

In the operation example 6, in the tuning of the layer-coded service, "TRUE" is designated as the signaling scope information in the FIC, and therefore, the SCS signaling data distributed via the broadcast describes information about all the components constituting the layer-coded service. Since "FALSE" is designated as the SCS shortcut information and "FALSE" is designated as the hybrid information, the stream of components constituting the layer-coded service is distributed by the broadcast distribution.

The reception apparatus 20 refers to the FIC, so that the reception apparatus 20 recognizes the information before obtaining the SCS signaling data, and the reception apparatus 20 can connect to the stream of the video and the audio distributed via the broadcast by referring to all the SCS signaling data obtained via the broadcast. As a result, the reception apparatus 20 can efficiently, appropriately, and easily obtain the video data and the audio data constituting the layer-coded service.

4. EXAMPLE OF SYNTAX (Syntax of FIC)

FIG. 10 is a figure illustrating an example of a syntax of FIC in a binary format. In FIG. 10, a newly defined element is indicated with bold letters.

In FIC_protocol_version having eight bits, version information of the FIC protocol is designated. In Broadcast_stream_id having 16 bits, a broadcast stream ID is designated.

SCD_exist_flag having one bit is an SCD flag indicating that the SCD exists in the LLS stream. Subsequently to a reserved area having seven bits, in a case where the SCD flag indicates that there exists the SCD in the LLS stream, the BBP stream ID of the BBP stream in which the LLS stream is transmitted is designated as a Bbpstream_id having eight bits.

FIC_level_descriptor( ) is a descriptor of FIC level.

The number of services is designated in num_services having eight bits. The service loop is repeated in accordance with the number of services . In the service loop, the following contents are designated.

In bbpstream_id having eight bits, the BBP stream ID is designated. In provider_id having sixteen bits, a provider ID is designated. In service_id having sixteen bits, the service ID is designated.

In service_data_version having eight bits, version information about data of the service is designated. In service_category having five bits, the category of the service is designated. For example, video, audio, ESG, and the like are designated as the category.

In short_service_name_length having three bits, the length of the short service name is designated. In short_service_name having 16*m bits, a short service name is designated. In service_status having three bits, service status information indicating whether the service is being provided or not is designated. In IP_version_flag having one bit, a flag indicating the version of the IP packet is designated.

In signalingscopeall having one bit, signaling scope information is designated. The signaling scope information indicates a reference range of the SCS signaling data distributed via the broadcast.

In num_of_class having three bits, the number of classes is designated. The class loop is repeated in accordance with the number of classes. In the class loop, the following contents are designated in order to describe the class information.

In class_id having four bits, a class ID is designated. In this class ID, for example, "core", "enhance", and the like are designated. In sp_indicator having one bit, encryption information indicating protection of the service is designated. For example, whether the video stream is encrypted or not is designated as the encryption information.

In SCS_src_IP_addr_flag, a flag indicating an IP address of a transmission source (source) of the IP packet is designated. Subsequent to a reserved area having two bits, in a case where SCS_src_IP_addr_flag indicates that there exists an IP address, the IP address of the transmission source (source) is designated as SCS_dst_IP_addr having 32 bits or 128 bits.

In SCS_dst_IP_addr having 32 bits or 128 bits, the destination (destination) IP address is designated. In SCS_dst_port having sixteen bits, a port number is designated. In SCS_TSI having sixteen bits, a TSI is designated. The SCS bootstrap information is formed by the IP address, the port number, and the TSI for obtaining the SCS signaling data.

In SCS_shortcut having one bit, the SCS shortcut information is designated. The SCS shortcut information indicates whether the service described in the FIC is the basic service or the rich service . In hybrid having one bit, the hybrid information is designated. The hybrid information indicates whether the stream of components constituting the service described in the FIC is distributed only via the broadcast (broadcast distribution) or distributed via the broadcast and via the communication (hybrid distribution). Subsequent to hybrid, a reserved area having six bits is provided.

It should be noted that the syntax of the FIC explained with reference to FIG. 10 is only an example, and other syntaxes may also be employed.

(Syntax of SCD)

FIG. 11 is a figure illustrating an example of a syntax of an SCD in an XML format. In FIG. 11, "@" is attached to attributes from among elements and attributes. The indented elements and attributes are designated for the parent element.

As illustrated in FIG. 11, the SCD element serving as the root element is the parent element of majorProtocolVersion attribute, minorProtocolVersion attribute, broadcaststreamId attribute, name attribute, Tuning_RF element, and, Service element.

In majorProtocolVersion attribute and minorProtocolVersion attribute, the version information of the protocol is designated. In broadcaststreamId attribute, the broadcast stream ID of the broadcast station is designated in units of physical channels. In name attribute, the name of the broadcast station is designated in units of physical channels.

In Tuning_RF element, information about tuning is designated. Tuning_RF element is a parent element of frequency attribute and preamble attribute. In frequency attribute, a frequency for tuning in to a predetermined band is designated. In preamble attribute, control information of the physical layer is designated.

In Service element, information about one or more services are designated. Service element is a parent element of serviceId attribute, globalUniqueServiceld attribute, longName attribute, and SignalingOverinternet element.

In serviceId attribute, the service ID is designated. Information about multiple services are disposed, the services are identified by this service ID. In globalUniqueServiceld attribute, a global unique service ID is designated. For example, with the global unique service ID, the service tuned with the ESG and the USED can be associated with each other. In longName attribute, the name of the service identified by the service ID is designated.

In SignalingOverinternet element, the SCS broadband location information is designated. With this SCS broadband location information, information about the SCS signaling data distributed via the communication is designated. SignalingOverInternet element is a parent element of the uri attribute. In the uri attribute, Uniform Resource Identifier (URI) indicating the location from which the SCS signaling data is obtained is designated.

In FIG. 11, in a case where "1" is designated as a cardinality, only one element or attribute is designated, and in a case where "0 . . . 1" is designated, whether or not the element or attribute is designated can be determined freely. In a case where "1 . . . n" is designated, one or more elements or attributes are designated, and in a case where "0 . . . n" is designated, whether or not one or more elements or attributes are designated can be determined freely.

It should be noted that the syntax of the SCD explained with reference to FIG. 11 is only an example, and other syntaxes may also be employed.

5. CONFIGURATION OF EACH APPARATUS CONSTITUTING SYSTEM

Subsequently, the detailed configuration of the transmission apparatus 10, the reception apparatus 20, and the broadband server 30 constituting the service providing system 1 of FIG. 1 will be explained with reference to FIG. 12 to FIG. 15.

(Configuration Example of Transmission Apparatus)

Figure 12:
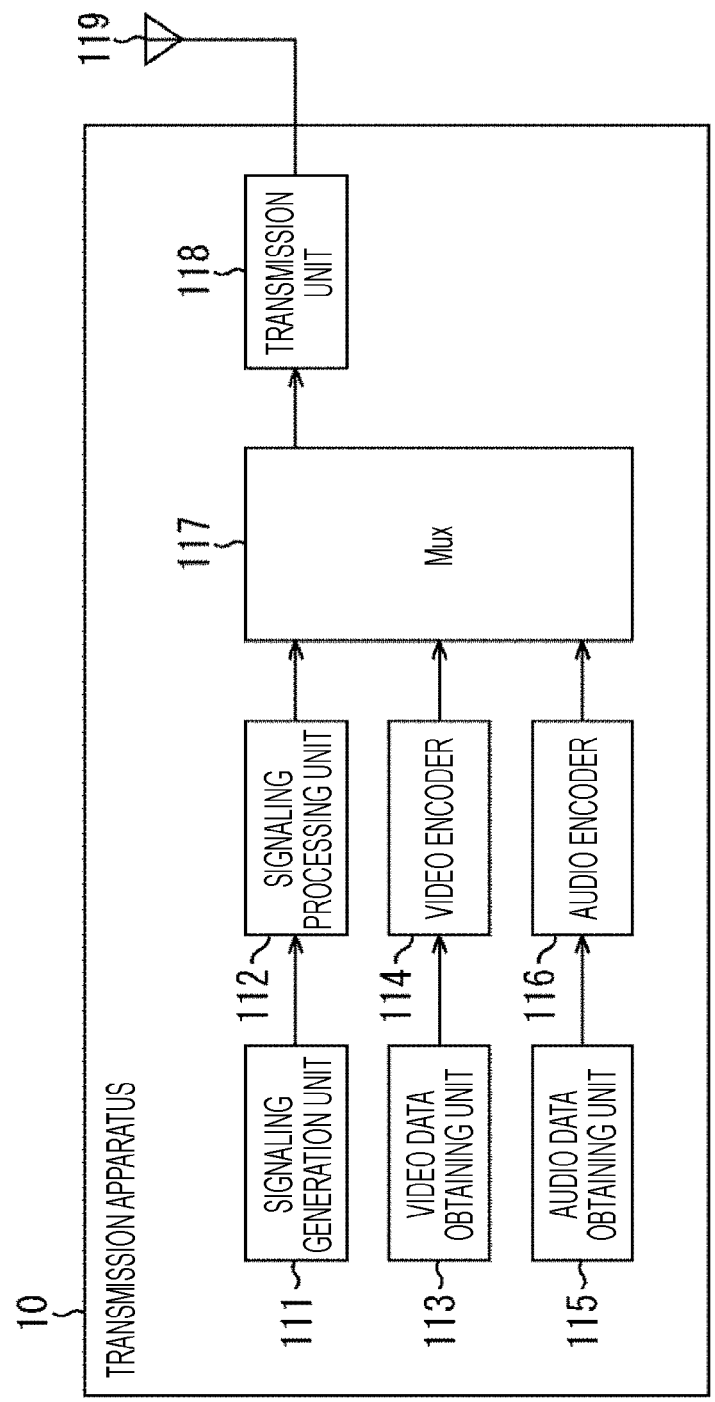
FIG. 12 is a figure illustrating a configuration of an embodiment of a transmission apparatus to which the present technique is applied.

FIG. 12 is a figure illustrating a configuration of an embodiment of a transmission apparatus to which the present technique is applied.

As illustrated in FIG. 12, the transmission apparatus 10 includes a signaling generation unit 111, a signaling processing unit 112, a video data obtaining unit 113, a video encoder 114, an audio data obtaining unit 115, an audio encoder 116, a Mux 117, and, transmission unit 118.

The signaling generation unit 111 obtains raw data for generating signaling data from an external server, an internal storage, and the like. The signaling generation unit 111 uses raw data of signaling data to generate signaling data, and provides the signaling data to the signaling processing unit 112.

The signaling processing unit 112 processes the signaling data provided from the signaling generation unit 111, and provides the signaling data to the Mux 117. In this case, the LLS signaling data constituted by the LLS meta data such as the FIC, the SCD, and the like, and the SSC signaling data constituted by the SSC meta data such as the USBD, the LSID, and the like are generated as the signaling data.

The video data obtaining unit 113 obtains video data provided from an external server, an internal storage, a video camera, and the like, and provides the video data to the video encoder 114. The video encoder 114 encodes the video data provided from the video data obtaining unit 113 in accordance with an encoding method such as Moving Picture Experts Group (MPEG), and provides the video data to the Mux 117.

The audio data obtaining unit 115 obtains audio data provided from an external server, an internal storage, a microphone, and the like, and provides the audio data to the audio encoder 116. The audio encoder 116 encodes audio data provided from the audio data obtaining unit 115 in accordance with an encoding method such as MPEG, and provides the audio data to the Mux 117.

The Mux 117 multiplexes a stream of signaling data from the signaling processing unit 112, a video stream from the video encoder 114, and an audio stream from the audio encoder 116 to generate a BBP stream, and provides the multiplexed stream to the transmission unit 118. The transmission unit 118 transmits the BBP stream provided from the Mux 117 via the antenna 119 as the broadcast wave of the digital broadcast using the IP transmission method (digital broadcast signal).

(Configuration Example of Reception Apparatus)

Figure 13:
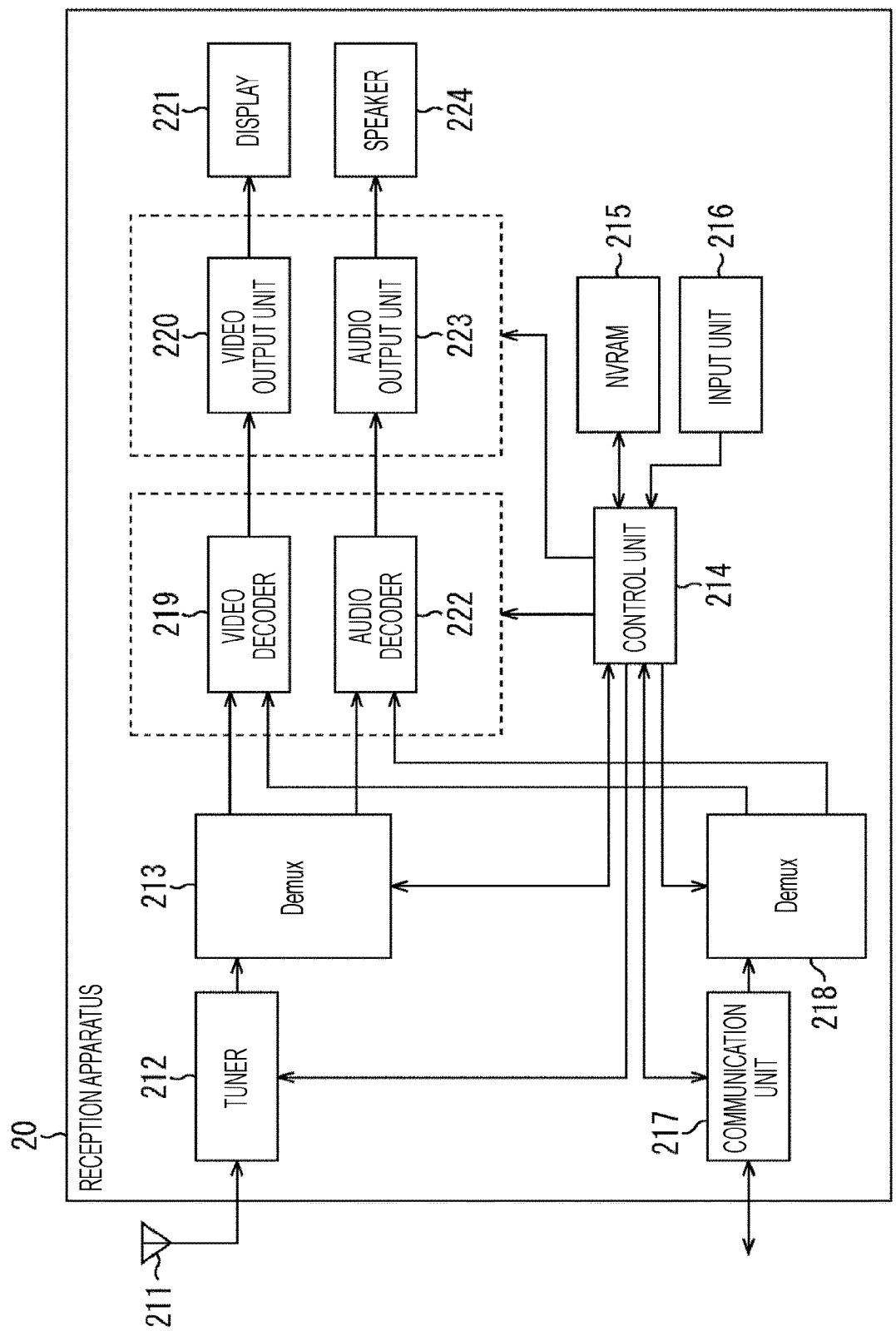
FIG. 13 is a figure illustrating a configuration of an embodiment of a reception apparatus to which the present technique is applied.

FIG. 13 is a figure illustrating a configuration of an embodiment of a reception apparatus to which the present technique is applied.

As illustrated in FIG. 13, the reception apparatus 20 includes a tuner 212, a Demux 213, a control unit 214, an NVRAM 215, an input unit 216, a communication unit 217, a Demux 218, a video decoder 219, a video output unit 220, a display 221, an audio decoder 222, an audio output unit 223, and a speaker 224.

The tuner 212 extracts and demodulates a digital broadcast signal according to user's service tuning operation from the broadcast wave of the digital broadcast using the IP transmission method received via the antenna 211 (digital broadcast signal) in accordance with control performed with the control unit 214, and, as a result, provides the obtained BBP stream to the Demux 213.

The Demux 213 separates the BBP stream provided from the tuner 212 into video, audio, and signaling data in accordance with the control performed with the control unit 214. The Demux 213 provides the video data to the video decoder 219, provides the audio data to the audio decoder 222, and provides the signaling data to the control unit 214.

The control unit 214 controls operation of each unit of the reception apparatus 20. The control unit 214 connects to the stream of components transmitted via the broadcast or via the communication on the basis of the signaling data provided from the Demux 213 or the communication unit 217, and controls operation of each unit in order to control reproduction of the component. It should be noted that the detailed configuration of the control unit 214 will be explained later with reference to FIG. 14.

The NVRAM 215 is a nonvolatile memory, and stores various kinds of data in accordance with control performed with the control unit 214. The input unit 216 provides an operation signal to the control unit 214 in accordance with user's operation.

The communication unit 217 connects to the broadband server 30 via the Internet 90 in accordance with control performed with the control unit 214, and requests distribution of the stream of components. The communication unit 217 receives the stream of components streamed and distributed from the broadband server 30 via the Internet 90, and provides the stream of components to the Demux 218. The communication unit 217 receives data such as SSC signaling data from the broadband server 30 via the Internet 90 in accordance with control performed with the control unit 214, and provides the data to the control unit 214.

The Demux 218 separates the stream of components provided from the communication unit 217 into the video data and the audio data in accordance with control performed with the control unit 214, and provides the video data to the video decoder 219 and the audio data to the audio decoder 222.

The video decoder 219 receives the video data from the Demux 213 or the Demux 218. The video decoder 219 decodes the video data on the basis of a decoding method such as MPEG in accordance with control performed with the control unit 214, and provides the video data to the video output unit 220. The video output unit 220 outputs the video data provided from the video decoder 219 to the display 221. Therefore, the display 221 displays, for example, a video of a program.

The audio decoder 222 receives the audio data from the Demux 213 or the Demux 218. The audio decoder 222 decodes the audio data on the basis of a decoding method such as MPEG in accordance with control performed with the control unit 214, and provides the audio data to the audio output unit 223. The audio output unit 223 outputs the audio data provided from the audio decoder 222 to the speaker 224. Therefore, the speaker 224 outputs, for example, audio corresponding to the video of the program.

In FIG. 13, in a case where the reception apparatus 20 is a set top box and the like, the reception apparatus 20 may be configured not to have the display 221 and the speaker 224. The reception apparatus 20 may be configured not to have any communication function such as the communication unit 217. Further, in the reception apparatus 20, the above reproducing processing unit (DASH player) is constituted by the video decoder 219, the video output unit 220, the audio decoder 222, and the audio output unit 223, and the control unit 214 controlling the video decoder 219, the video output unit 220, the audio decoder 222, and the audio output unit 223.

(Functional Configuration Example of Control Unit)

Figure 14:
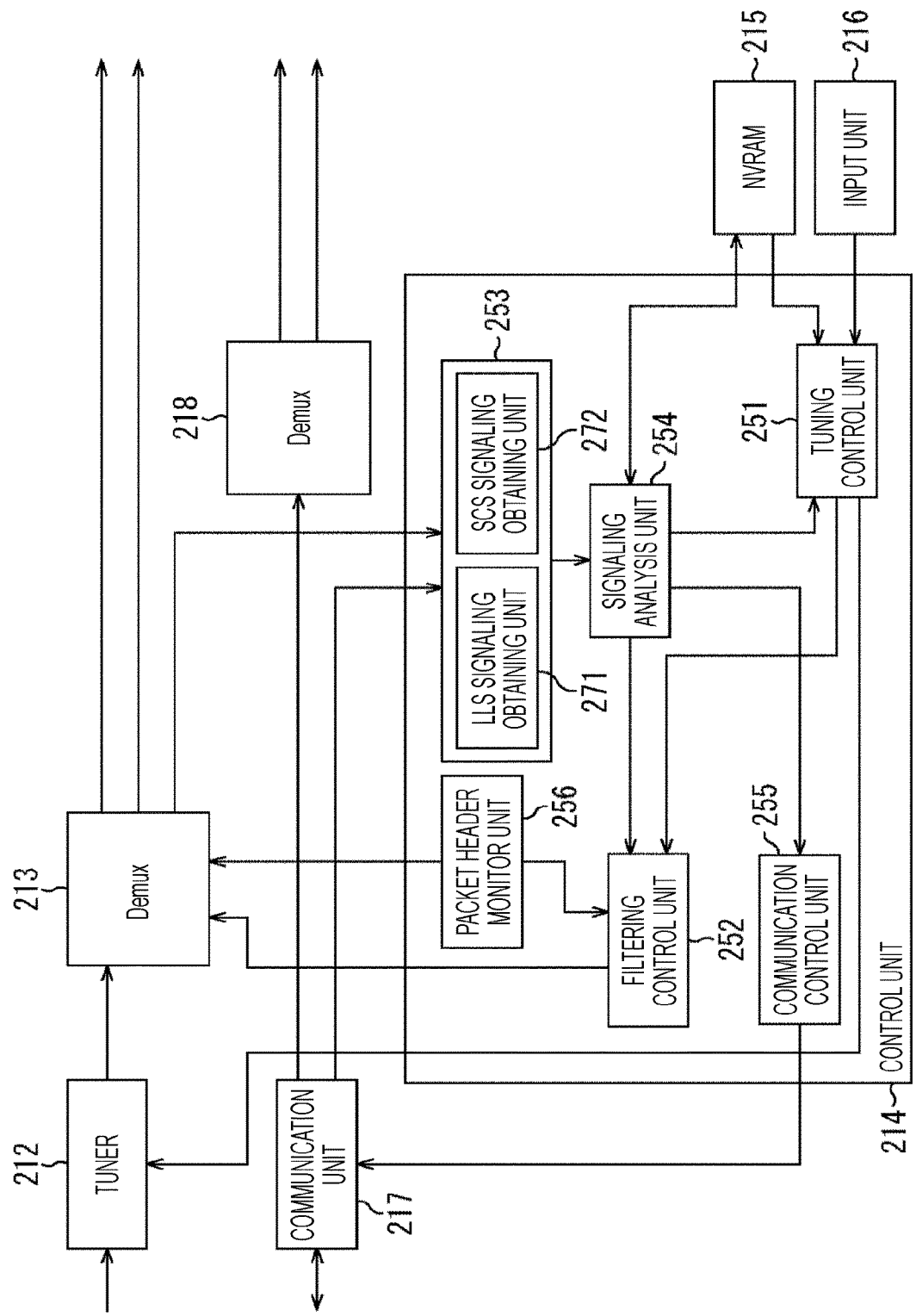
FIG. 14 is a figure illustrating a functional configuration example of a control unit of FIG. 13.

FIG. 14 is a figure illustrating a functional configuration example of a portion controlling initial scan processing, tuning processing, filtering processing, and communication processing in the control unit 214 of FIG. 13.

In FIG. 14, the control unit 214 includes a tuning control unit 251, a filtering control unit 252, a signaling obtaining unit 253, a signaling analysis unit 254, a communication control unit 255, and a packet header monitor unit 256. The signaling obtaining unit 253 includes an LLS signaling obtaining unit 271 and an SCS signaling obtaining unit 272.

The tuning control unit 251 controls tuning processing executed by the tuner 212. The filtering control unit 252 controls the filtering processing executed by the Demux 213.

In the initial scan processing, the tuning control unit 251 controls the tuner 212, the filtering control unit 252 controls the Demux 213, so that the LLS signaling obtaining unit 271 obtains the LLS signaling data transmitted in the LLS stream, and provides the LLS signaling data to the signaling analysis unit 254. The signaling analysis unit 254 records, to the NVRAM 215, the tuning information obtained by analyzing the LLS signaling data (LLS meta data such as the FIC and the SCD) from the LLS signaling obtaining unit 271.

In a case where the user performs service tuning operation, the tuning control unit 251 obtains the tuning information (the FIC and the SCD) recorded in the NVRAM 215 in accordance with the operation signal provided from the input unit 216. The tuning control unit 251 controls the tuning processing executed by the tuner 212 on the basis of the obtained tuning information. The tuning control unit 251 provides the SCS bootstrap information included in the tuning information (FIC) to the filtering control unit 252.

The filtering control unit 252 controls the filtering processing executed by the Demux 213 on the basis of the SCS bootstrap information provided from the tuning control unit 251. Therefore, the Demux 213 connects to the SCS stream constituting the service of the tuning target, and in a case where the stream is transmitted in the ROUTE session, the SCS signaling data is extracted from the LCT packet. The SCS signaling obtaining unit 272 obtains the SCS signaling data (SCS meta data such as USED, USD, SDP, MPD, and LSID), and provides the SCS signaling data to the signaling analysis unit 254.

The signaling analysis unit 254 analyzes the SCS signaling data (SCS meta data such as USBD, USD, SDP, MPD, and LSID) provided from the SCS signaling obtaining unit 272, and provides the analysis result to the filtering control unit 252 or the communication control unit 255. More specifically, in a case where the distribution route of the stream of components constituting the service of the tuning target is via the broadcast, the signaling analysis unit 254 identifies the IP address, the port number, the TSI, and the TOI for connecting to the stream of components, and provides the IP address, the port number, the TSI, and the TOI to the filtering control unit 252. In a case where the distribution route of the stream of components constituting the service of the tuning target is via the communication, the signaling analysis unit 254 provides information about the location where they are obtained (for example, a URL) to the communication control unit 255.

The filtering control unit 252 controls the filtering processing executed by the Demux 213 on the basis of the IP address, the port number, the TSI, and the TOI provided form the signaling analysis unit 254. Therefore, the Demux 213 executes the filtering processing of the LCT packet, and extracts the segment data from the LCT packet obtained therefrom. Then, the video data obtained as a result is provided to the video decoder 219, and the audio data is provided to the audio decoder 222.

The communication control unit 255 controls the communication processing executed by the communication unit 217 on the basis of information about the acquisition location (for example, a URL) provided from the signaling analysis unit 254. Therefore, the communication unit 217 receives the stream of components streamed and distributed from the broadband server 30 via the Internet 90, and provides the stream of components to the Demux 218. Then, with the Demux 218, the video data obtained from the stream provided from the communication unit 217 is provided to the video decoder 219, and the audio data is provided to the audio decoder 222. In a case where the SCS signaling data is distributed from the broadband server 30, the SCS signaling data from the communication unit 217 is provided to the SCS signaling obtaining unit 272.

The packet header monitor unit 256 monitors packets transmitted in the BBP stream at the Demux 213, and analyzes the header of the packet of the monitor target. The packet header monitor unit 256 controls the filtering control unit 252 in accordance with the analysis result of the header of the packet, so that the LLS meta data and the SCS meta data obtained from the packet satisfying a particular condition are obtained by the signaling obtaining unit 253. In this filtering processing, for example, filtering is performed by using at least one of pieces of information including compression information (Compression Scheme), type information (Fragment Type), expansion type information (Type Extension), and version information as a particular condition.

(Configuration Example of Broadband Server)

Figure 15:
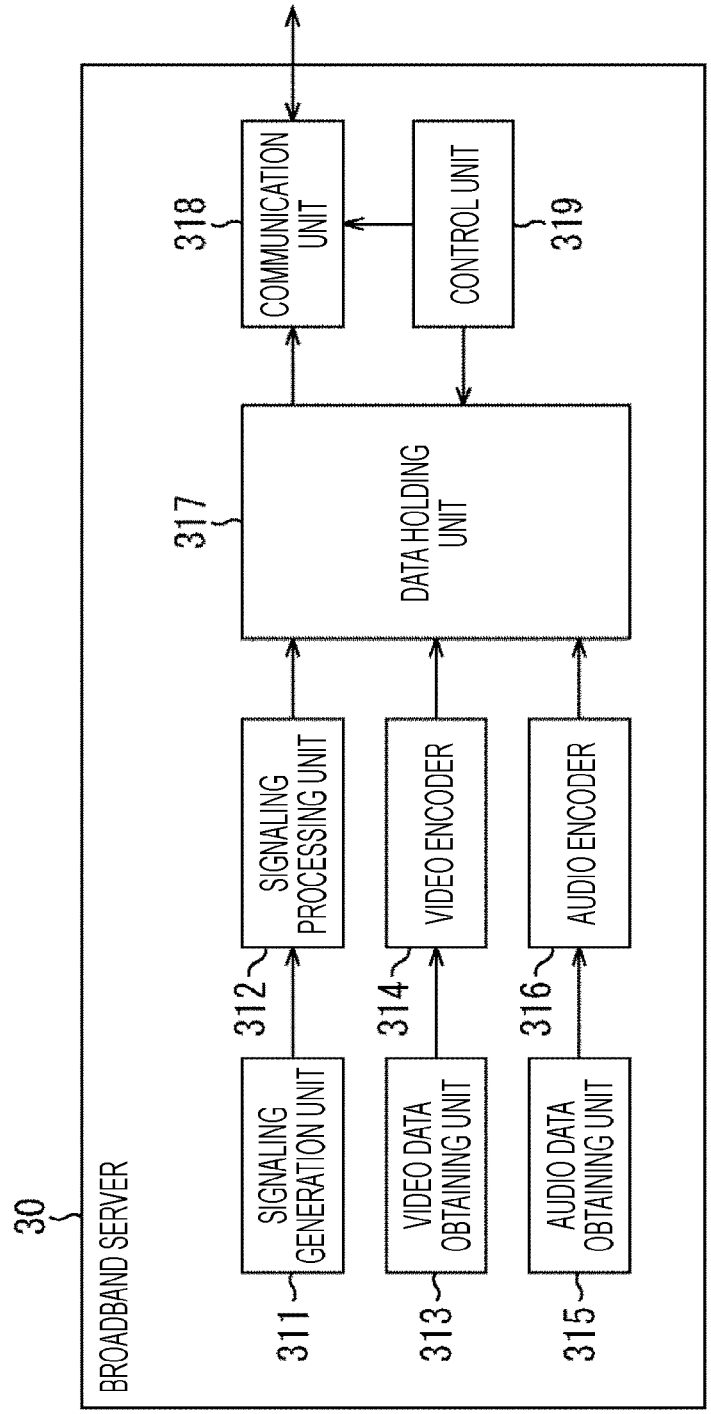
FIG. 15 is a figure illustrating a configuration of an embodiment of a broadband server to which the present technique is applied.

FIG. 15 is a figure illustrating a configuration of an embodiment of a broadband server to which the present technique is applied.

As illustrated in FIG. 15, the broadband server 30 includes a signaling generation unit 311, a signaling processing unit 312, a video data obtaining unit 313, a video encoder 314, an audio data obtaining unit 315, an audio encoder 316, a data holding unit 317, a communication unit 318, and a control unit 319.

The signaling generation unit 311 obtains raw data for generating SCS signaling data from an external server, an internal storage, and the like. The signaling generation unit 311 uses raw data of SCS signaling data to generate the SCS signaling data, and provides the SCS signaling data to the signaling processing unit 312.

The signaling processing unit 312 processes the SCS signaling data provided from the signaling generation unit 311, and holds the SCS signaling data in the data holding unit 317. In this case, the SCS meta data such as the USBD and the LSID is generated as the SCS signaling data.

The video data obtaining unit 313 obtains the video data provided from an external server, an internal storage, a video camera, and the like, and provides the video data to the video encoder 314. The video encoder 314 encodes the video data provided from the video data obtaining unit 313 on the basis of an encoding method such as MPEG, and holds the video data in the data holding unit 317.

The audio data obtaining unit 315 obtains the audio data provided from an external server, an internal storage, a microphone, and the like, and provides the audio data to the audio encoder 316. The audio encoder 316 encodes the audio data provided from the audio data obtaining unit 315 on the basis of an encoding method such as MPEG, and holds the audio data in the data holding unit 317.

The data holding unit 317 holds the SCS signaling data given from the signaling processing unit 312, the video data given from the video encoder 314, and the audio data given from the audio encoder 316 in accordance with control performed with the control unit 319.

The communication unit 318 communicates with the reception apparatus 20 via the Internet 90 in accordance with control performed with the control unit 319. The communication unit 318 reads the SCS signaling data, the video data, or the audio data held in the data holding unit 317 in accordance with a request given from the reception apparatus 20, transmits the SCS signaling data, the video data, or the audio data to the reception apparatus 20, which has issued the request, via the Internet 90.

6. Flow of Processing Executed by Each Apparatus

Subsequently, a specific flow of processing executed by each apparatus constituting the service providing system 1 of FIG. 1 will be explained with reference to the flowchart in FIG. 16 to FIG. 21.

(Transmission Processing)

First, a flow of transmission processing executed by the transmission apparatus 10 will be explained with reference to the flowchart in FIG. 16.

In step S111, the signaling generation unit 111 uses the raw data of the signaling data to generate the signaling data, and provides the signaling data to the signaling processing unit 112. In step S112, the signaling processing unit 112 processes the signaling data provided from the signaling generation unit 111, and provides the signaling data to the Mux 117.

In this case, the LLS meta data such as the FIC and the SCD and the SCS meta data such as the USBD and the LSID are generated as signaling data. However, the signaling data may be generated by an external server. In this case, the signaling generation unit 111 provides the signaling processing unit 112 with the signaling data provided from the external server as it is.

In step S113, the video data obtaining unit 113 obtains video data which is components from an external server, and provides the video data to the video encoder 114. In step S113, the audio data obtaining unit 115 obtains audio data which is components from an external server, and provides the audio data to the audio encoder 116.

In step S114, the video encoder 114 encodes the video data which is components provided from the video data obtaining unit 113 on the basis of an encoding method such as MPEG, and provides the video data to the Mux 117. In step S114, the audio encoder 116 encodes the audio data which is components provided from the audio data obtaining unit 115 on the basis of an encoding method such as MPEG, and provides the audio data to the Mux 117.

In step S115, the Mux 117 generates the BBP stream by multiplexing the signaling data given by the signaling processing unit 112, the video stream given by the video encoder 114, and the audio stream given by the audio encoder 116, and provides the multiplexed stream to the transmission unit 118.

In step S116, the transmission unit 118 transmits the BBP stream provided from the Mux 117, as a digital broadcast signal, via the antenna 119. When the processing of step S116 is finished, the transmission processing of FIG. 16 is terminated.

Figure 16:
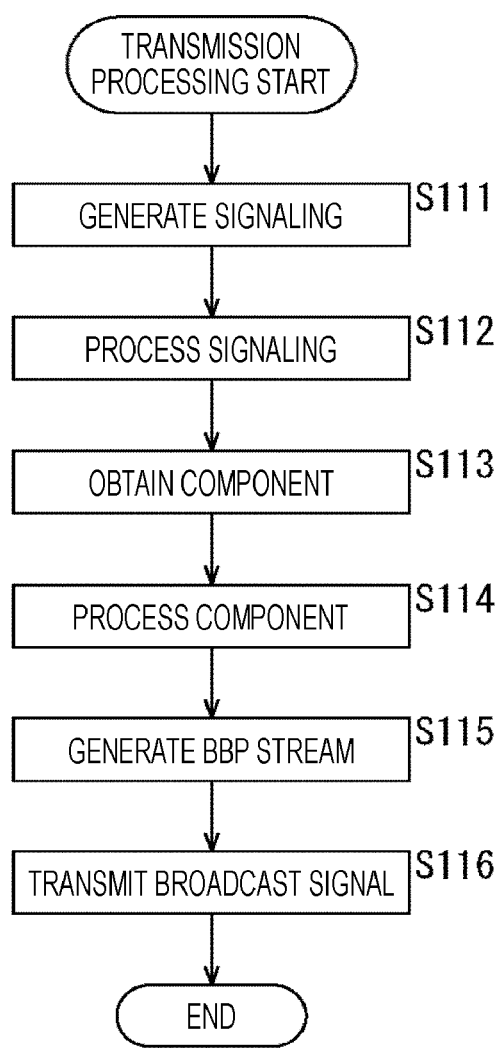
FIG. 16 is a flowchart for explaining transmission processing.

In a case where the stream of components such as video and audio are transmitted in the ROUTE session in the transmission processing of FIG. 16, the file of each component is divided into segments based on the standard of ISO BMFF, and the segment data obtained therefrom is stored in an LCT packet and is transmitted.

Further, in the digital broadcast signal, an LLS header of an LLS packet storing LLS signaling data (LLS meta data such as the FIC and the SCD) or an LCT header of an LCT packet storing an SCS signaling data (meta data such as the USBD and the LSID) can be arranged with filtering information such as compression information (Compression Scheme), type information (Fragment Type), expansion type information (Type Extension), and version information.

The flow of the transmission processing has been explained above.

(Frequency Scan Processing)

Figure 17:
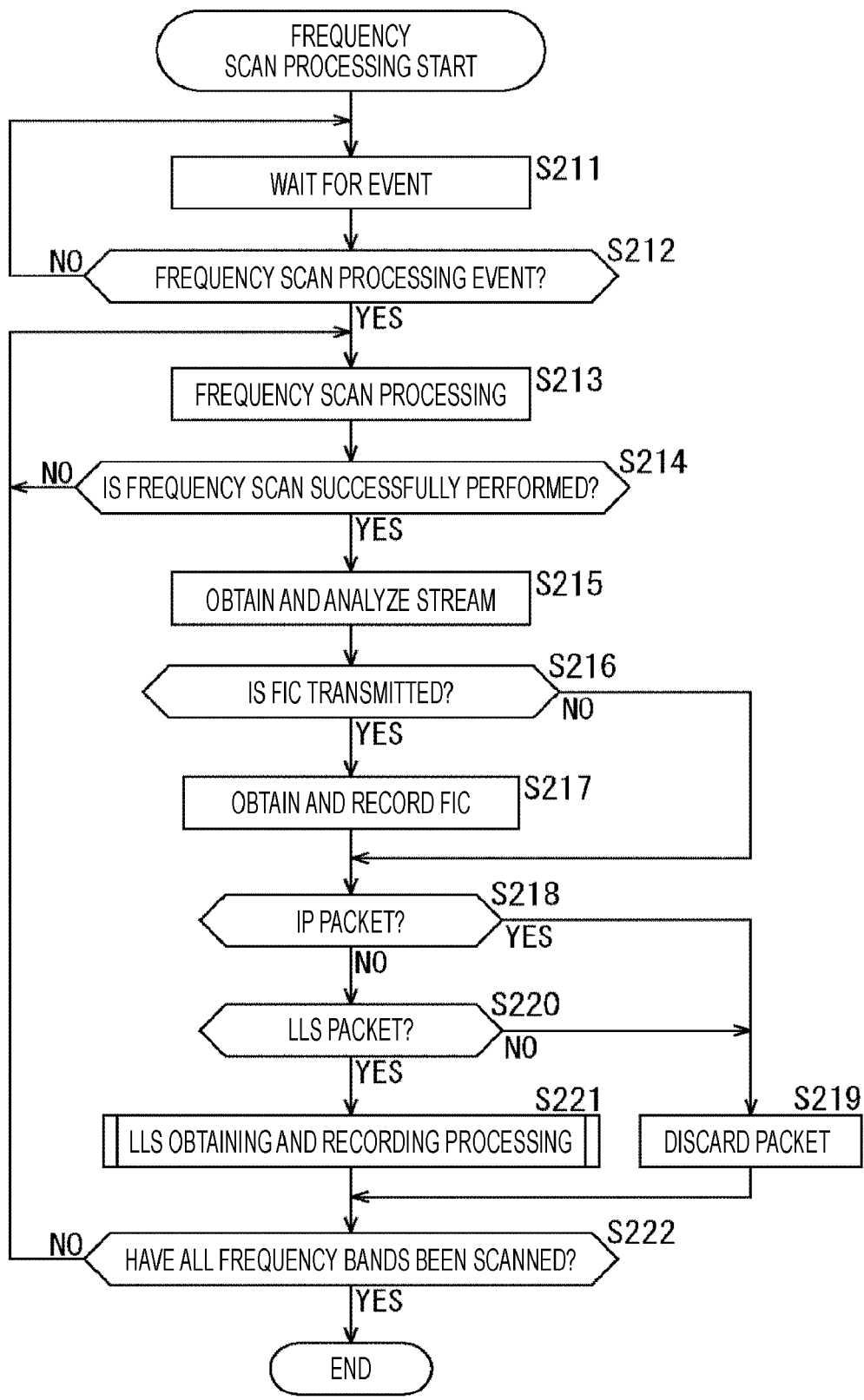
FIG. 17 is a flowchart for explaining frequency scan processing.

Subsequently, a flow of frequency scan processing executed by the reception apparatus 20 will be explained with reference to the flowchart in FIG. 17.

In step S211, the control unit 214 monitors an operation signal and the like from the input unit 216, and waits until a frequency scan processing event occurs. Then, in step S212, in a case where the frequency scan processing event is determined to have occurred, the processing in step S213 is subsequently performed.

In step S213, the tuner 212 performs the frequency scan processing in accordance with control performed by the tuning control unit 251. In step S214, a determination is made as to whether the frequency scan has been successfully completed or not in the frequency scan processing in step S213.

In a case where the frequency scan is determined to have failed in step S214, the processing in step S213 is subsequently performed again, so that the frequency scan processing is performed again. On the other hand, in a case where the frequency scan processing is determined to have been successfully completed in step S214, the processing in step S215 is subsequently performed.

In step S215, the Demux 213 obtains and analyzes the BBP stream provided from the tuner 212 in accordance with control performed by the filtering control unit 252. In step S216, a determination is made as to whether the FIC is transmitted or not.

In step S216, in a case where the FIC is determined to be transmitted, the processing in step S217 is subsequently performed. In step S217, the FIC is obtained, and is recorded to the NVRAM 215. In a case where the FIC is determined not to be transmitted in step S216, the processing in step S217 is skipped, and the processing in step S218 is subsequently performed.

In step S218, in accordance with the analysis result in step S215, a determination is made as to whether an IP packet is extracted or not from the BBP stream.

In a case where an IP packet is determined to be extracted in step S218, the processing in step S219 is subsequently performed. In step S219, the Demux 213 discards the extracted IP packet. On the other hand, in a case where a packet other than the IP packet is determined to be extracted in step S218, the processing in step S220 is subsequently performed.

In step S220, in accordance with the analysis result in step S215, a determination is made as to whether an LLS packet is extracted from the BBP stream or not.

In a case where a packet other than the LLS packet is determined to be extracted in step S220, the processing in step S219 is subsequently performed. In step S219, the Demux 213 discards the extracted packet that is not the LLS packet. On the other hand, in a case where an LLS packet is determined to be extracted in step S220, the processing in step S221 is subsequently performed.

In step S221, the Demux 213 and the control unit 214 execute processing for obtaining and recording the LLS. In this processing for obtaining and recording the LLS, the filtering processing is performed on the basis of filtering information of the LLS header added to the LLS packet, and the LLS signaling data (LLS meta data such as SCD) obtained in the filtering processing is recorded as tuning information to the NVRAM 215. It should be noted that the detailed content of the processing for obtaining and recording the LLS will be explained later with reference to a flowchart in FIG. 18.

When the processing in step S219 or step S221 is finished, the processing in step S222 is subsequently performed. In step S222, a determination is made as to whether the scan of all the frequency band is completed or not.

In a case where the scan of all the frequency band is determined to be incomplete in step S222, the processing in step S213 is subsequently performed again, and the processing in step S213 and subsequent steps is repeated. Therefore, the scan processing of all the frequency band is performed, and the tuning information is recorded. Then, in a case where the scan of all the frequency band is determined to have been completed in step S222, the frequency scan processing of FIG. 17 is terminated.

The flow of the frequency scan processing has been hereinabove explained.

(Processing for Obtaining and Recording LLS)

Figure 18:
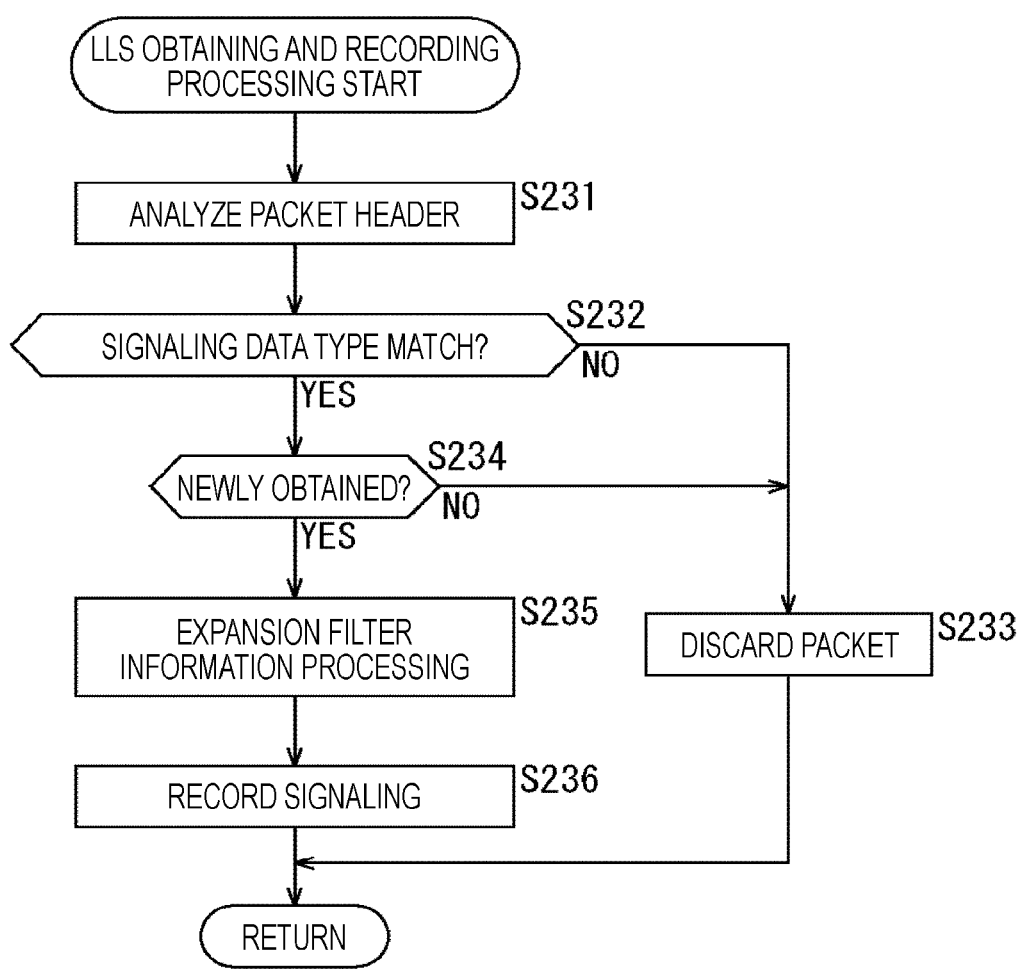
FIG. 18 is a flowchart for explaining processing for obtaining and recording LLS.

Subsequently, the detailed content of the processing for obtaining and recording the LLS corresponding to the processing in step S221 of FIG. 17 will be explained with reference to the flowchart in FIG. 18.

In step S231, the packet header monitor unit 256 monitors the LLS packet transmitted in the BBP stream at the Demux 213 at all times, and analyzes the LLS header of the LLS packet which is to be monitored.

In step S232, the packet header monitor unit 256 determines whether the type of the signaling data (LLS meta data) matches or not in accordance with the analysis result in step S231. More specifically, in the LLS header of the LLS packet, type information (Fragment Type) is disposed, and accordingly, the packet header monitor unit 256 determines whether, for example, an LLS packet added with an LLS header arranged with type information, i.e., Type="000000", is extracted or not.

It should be noted that a value according to the type of the LLS meta data is designated in the type information (Fragment Type) of the LLS header. For example, "000000" is designated in the SCD, "000001" is designated in the EAD, "000010" is designated in the RRD, and "000011" is designated in the DCD.

In a case where the type of the signaling data (LLS meta data) is determined to be different in step S232, the processing in step S233 is subsequently performed. In step S233, the Demux 213 discards the extracted LLS packet. On the other hand, in a case where the type of the signaling data (LLS meta data) is determined to match in step S232, the processing in step S234 is subsequently performed.

In step S234, the packet header monitor unit 256 determines whether the target LLS signaling data (LLS meta data) is newly obtained or not in accordance with the analysis result in step S231. More specifically, the LLS header of the LLS packet includes version information disposed therein, and therefore, the packet header monitor unit 256 determines whether the LLS packet added with the LLS header having the version information of the latest version disposed therein is extracted or not.

In step S234, in a case where the target LLS signaling data (LLS meta data) is determined to have already been obtained, the processing in step S233 is subsequently performed. In step S233, the Demux 213 discards the extracted LLS packet. On the other hand, in a case where the target LLS signaling data (LLS meta data) is determined to be newly obtained in step S234, the processing in step S235 is subsequently performed.

In step S235, the packet header monitor unit 256 performs processing of expansion filter information (Filter Extension) in accordance with the analysis result in step S231. More specifically, the expansion type information is disposed in the LLS header of the LLS packet, and therefore, in the processing of the expansion filter information, for example, a determination is made as to whether the LLS packet added with the LLS header arranged with the expansion filter information satisfying a predetermined particular condition such as a target area and a degree of emergency is extracted or not.

It should be noted that the filtering control unit 252 controls the Demux 213 in accordance with the control performed with the packet header monitor unit 256, and performs the filtering processing of the LLS packets which are to be monitored, and the LLS signaling data obtained from the LLS packet satisfying the particular condition from among the LLS packets which are to be monitored is obtained by the LLS signaling obtaining unit 271.

In step S236, the signaling analysis unit 254 records the LLS signaling data obtained by the LLS signaling obtaining unit 271 (the LLS meta data such as the SCD) to the NVRAM 215. Therefore, the NVRAM 215 records the tuning information obtained from the LLS signaling data (the LLS meta data such as the SCD). When the processing in step S233 or step S236 is finished, the processing in step S221 of FIG. 17 is subsequently performed again, and the processing subsequent thereto is executed.

The flow of the processing for obtaining and recording the LLS has been hereinabove explained.

(Pre-Tuning Processing)

Subsequently, a flow of pre-tuning processing executed by the reception apparatus 20 will be explained with reference to the flowchart in FIG. 19.

In step S251, the tuning control unit 251 monitors an operation signal and the like given from the input unit 216, and waits until a service tuning event occurs. Then, in a case where a service tuning event is determined to have occurred in step S252, the processing in step S253 is subsequently performed.

In step S253, the tuning control unit 251 obtains the service ID (channel number) corresponding to the tuned service. In step S254, the tuning control unit 251 determines whether the tuning information (FIC) has been recorded and obtained or not by referring to the NVRAM 215.

In a case where the tuning information is determined to have been obtained in step S254, the processing in step S255 is subsequently performed. In step S255, the tuning control unit 251 reads and obtains the tuning information (the FIC and the SCD) recorded in the NVRAM 215.

On the other hand, in the case where the tuning information is determined not to have been obtained in step S254, the processing in step S256 is subsequently performed. In step S256, the Demux 213 and the control unit 214 obtains the FIC from the LLS stream. Therefore, the control unit 214 obtains the tuning information (the FIC and the SCD) (S255). Instead of the LLS stream, the FIC may be transmitted in, for example, a lower layer (layer) such as a physical layer, and in such case, the FIC is obtained therefrom.

In step S257, the tuner 212, the Demux 213, the control unit 214, and the like perform the tuning processing on the basis of the tuning information (the FIC and the SCD) obtained in the processing of step S255. The detailed content of the tuning processing will be explained with reference to the flowchart of FIG. 20 and FIG. 21.

The flow of the pre-tuning processing has been hereinabove explained.

(Tuning Processing)

Subsequently, the detailed content of the tuning processing corresponding to the processing in step S257 of FIG. 19 will be explained with reference to the flowchart in FIG. 20.

In step S271, the signaling analysis unit 254 reads the FIC recorded in the NVRAM 215, and analyzes the class information described in the FIC. In this case, a determination is made as to whether the reception apparatus 20, i.e., a target (for example, a mobile receiver and a fixed receiver) belongs to which of the classes of, e.g., an enhanced class, a core class, and the like. Then, on the basis of this determination result, subsequent processing is executed.

In step S272, the control unit 214 determines whether the reception apparatus 20 has the communication function or not, and in a case where the reception apparatus 20 has the communication function, the control unit 214 determines whether the function is effective or not, so that a determination is made as to whether the reception apparatus 20 can receive only the broadcast or not. In a case where, for example, if the reception apparatus 20B is determined not to have the communication function such as the communication unit 217 and is determined to be able to receive only the broadcast in step S272, the processing in step S273 is subsequently performed.

In step S273, the signaling analysis unit 254 determines whether "TRUE" is designated as the SCS shortcut information (SCS_shortcut) or not by referring to the tuning information (FIC) recorded in the NVRAM 215.

In a case where "TRUE" is determined to be designated as the SCS shortcut information (SCS_shortcut) in step S273, the processing in step S274 is subsequently performed. In step S274, the SCS signaling obtaining unit 272 obtains the MPD and the LSID transmitted in the ROUTE session in accordance with the result of the filtering processing executed by the Demux 213. The MPD and the LSID obtained in the processing in step S274 are analyzed by the signaling analysis unit 254, and the analysis result thereof is provided to the filtering control unit 252.

In step S275, the filtering control unit 252 controls the filtering processing executed by the Demux 213 on the basis of the analysis result (the IP address, the port number, the TSI, and the TOI) provided from the signaling analysis unit 254.

Therefore, in the Demux 213, the filtering processing of the LCT packets is executed, and segment data is extracted from the LCT packet obtained therefrom, and the components constituting the tuned service are obtained (captured). In step S276, a determination is made as to whether all the components to be obtained are captured or not, and the processing in step S275 is repeated until all the components are captured, so that, for example, the video data and the audio data constituting the tuned service are obtained (captured).

Figure 19:
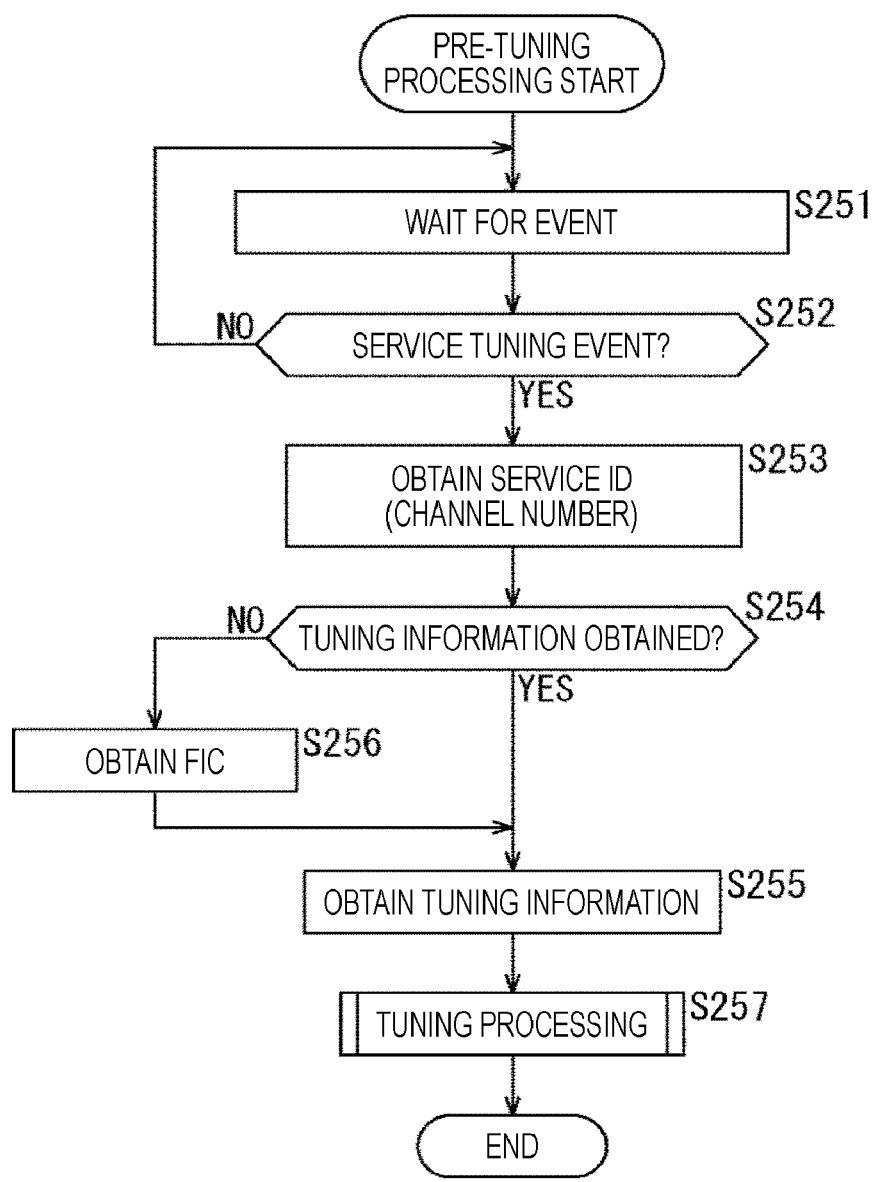
FIG. 19 is a flowchart for explaining pre-tuning processing.

Then, for example, the video data and the audio data obtained in the processing in step S275 are decoded, and the rendering processing and the like are performed, so that the video and the audio of the program corresponding to the service tuned in the processing in step S252 of FIG. 19 are reproduced, and the viewer starts to view the service (S281).

As described above, in a case where "TRUE" is designated as the SCS shortcut information (SCS_shortcut) of the FIC, a desired component can be obtained by using the MPD and the LSID without referring to all the SCS meta data.

On the other hand, in a case where "FALSE" is determined to be designated as the SCS shortcut information. (SCS_shortcut) in step S273, the processing in step S277 is subsequently performed. In step S277, the SCS signaling obtaining unit 272 obtains the SCS signaling data such as the USBD, the USD, the MPD, and the SDP transmitted in the ROUTE session in accordance with the result of the filtering processing executed by the Demux 213. The SDP obtained in the processing of step S277 is analyzed by the signaling analysis unit 254, and the analysis result is provided to the filtering control unit 252.

In step S278, the SCS signaling obtaining unit 272 obtains the LSID transmitted in the ROUTE session in accordance with the result of the filtering processing executed by the Demux 213. The LSID obtained in the processing of step S278 is analyzed by the signaling analysis unit 254, and the analysis result is provided to the filtering control unit 252.

In step S279, the filtering control unit 252 controls the filtering processing executed by the Demux 213 on the basis of the analysis result (the IP address, the port number, the TSI, and the TOI) provided from the signaling analysis unit 254.

Therefore, in the Demux 213, the filtering processing of the LCT packets is executed, and the segment data is extracted from the LCT packet obtained therefrom, and the components constituting the tuned service are obtained (captured). In step S280, a determination is made as to whether all the components to be obtained are captured or not, and the processing in step S279 is repeated until all the components are captured, so that, for example, the video data and the audio data constituting the tuned service are obtained (captured).

Then, for example, the video data and the audio data obtained in the processing in step S279 are decoded, and the rendering processing and the like are performed, so that the video and the audio of the program corresponding to the service tuned in the processing in step S252 of FIG. 19 are reproduced, and the viewer starts to view the service (S281).

As described above, in a case where "FALSE" is designated as the SCS shortcut information (SCS_shortcut) of the FIC, the location where the components are obtained cannot be identified from only the contents described in the MPD and the LSID, and therefore, a desired component is obtained by referring to not only the MPD and the LSID but also other SCS meta data such as the USBD, the USD, the SDP, and the like. When the processing in step S281 is finished, the processing in step S257 of FIG. 19 is subsequently performed again, and the processing subsequent thereto is executed.

In a case where the reception apparatus 20 (reception apparatus 20A) is determined to be supporting the hybrid reception of the broadcast and the communication in step S272, the processing in step S282 is subsequently performed. In step S282, the tuning processing supporting the hybrid of the broadcast and the communication is performed. It should be noted that the detailed content of the tuning processing supporting the hybrid will be explained later with reference to the flowchart of FIG. 21.

The flow of the tuning processing has been hereinabove explained.

(Tuning Processing Supporting Hybrid)

Subsequently, the detailed content of the tuning processing supporting the hybrid corresponding to the processing in step S282 of FIG. 20 will be explained with reference to the flowchart of FIG. 21.

In step S291, the signaling analysis unit 254 determines whether "TRUE" is designated as the hybrid information (hybrid) by referring to the tuning information (FIC) recorded in the NVRAM 215.

Figure 20:
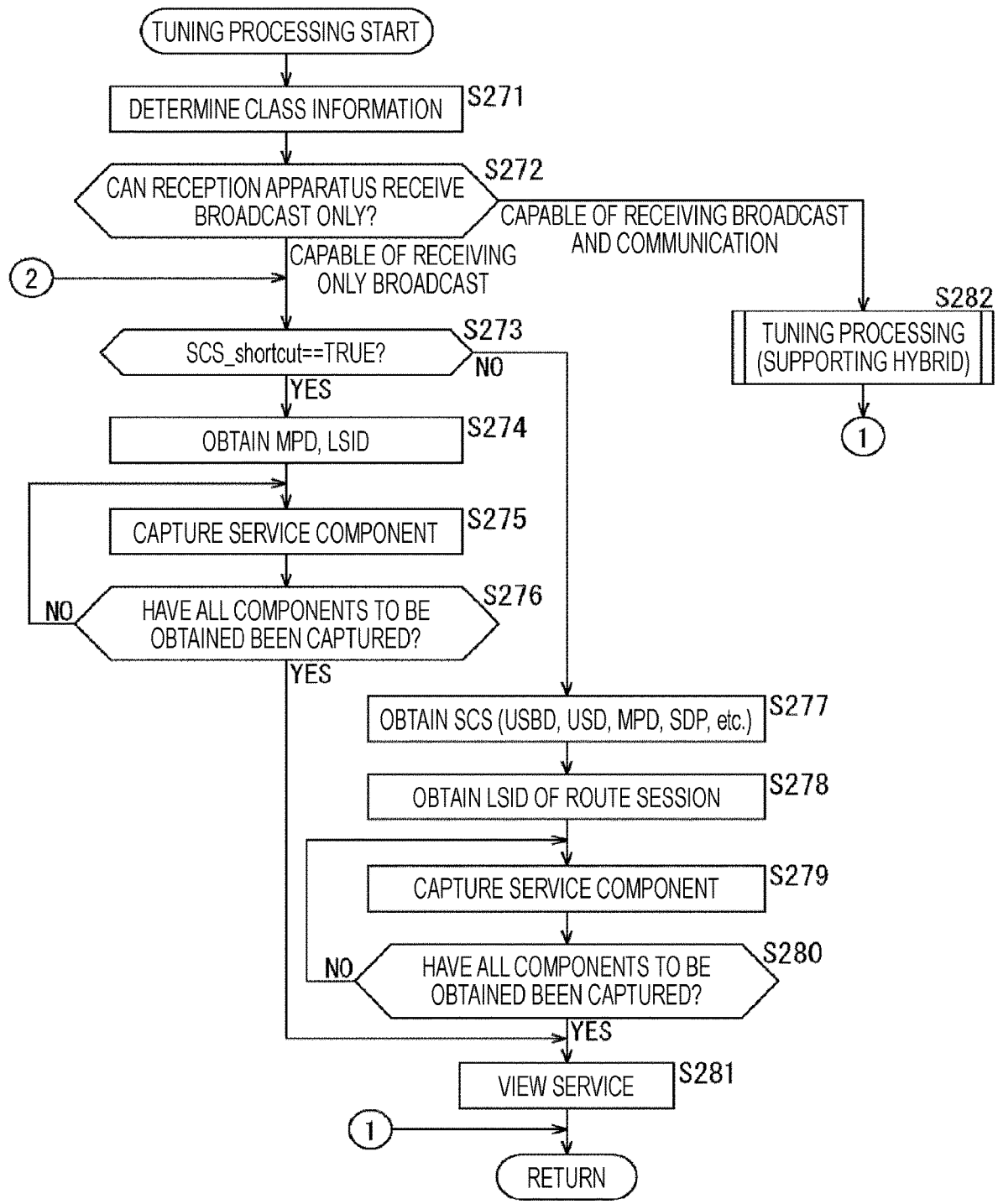
FIG. 20 is a flowchart for explaining tuning processing.
Figure 21:
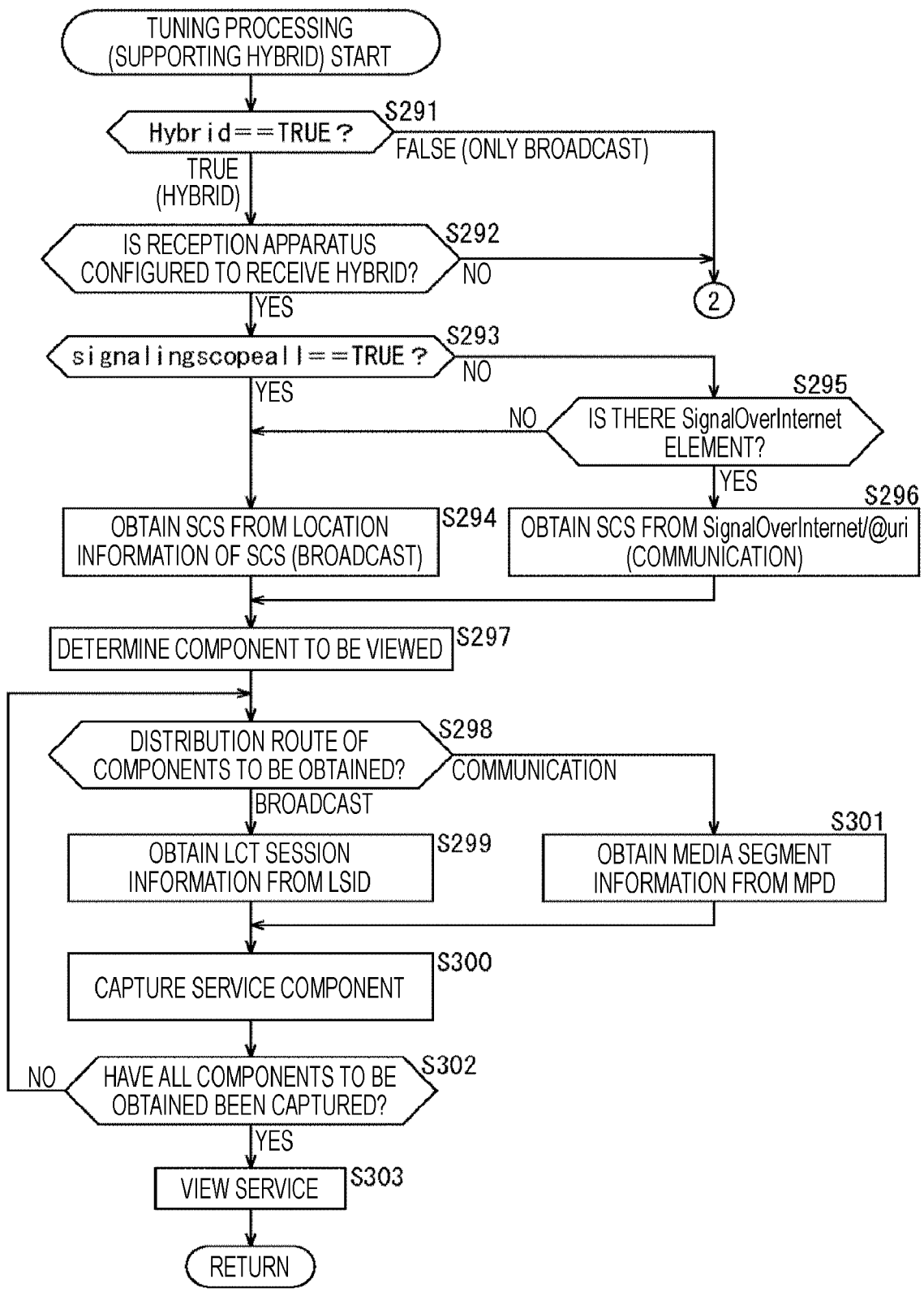
FIG. 21 is a flowchart for explaining tuning processing supporting hybrid.

In a case where "TRUE" is determined not to be designated as the hybrid information (hybrid) in step S291, the processing in step S273 of FIG. 20 is subsequently performed, and the processing subsequent thereto is executed. More specifically, in this case, this means that the stream of components is distributed only via the broadcast, and therefore, even the reception apparatus 20A supporting the hybrid reception does not use the communication function, and performs the same processing as the reception apparatus 20B capable of receiving only the broadcast.

In a case where "TRUE" is determined to be designated as the hybrid information (hybrid) in step S291, the processing in step S292 is subsequently performed. In step S292, a determination is made as to whether the reception apparatus 20 is configured to be able to perform hybrid reception by enabling the communication function.

In a case where the reception apparatus 20 is determined not to be configured to be able to perform the hybrid reception in step S292, the processing in step S273 of FIG. 20 is subsequently performed, and the processing subsequent thereto is executed. More specifically, in this case, even the reception apparatus 20A supporting the hybrid does not use the communication function, and performs the same processing as the reception apparatus 20B capable of receiving only the broadcast.

In a case where the reception apparatus 20 is determined to be configured to be able to perform the hybrid reception in step S292, the processing in step S293 is subsequently performed. In step S293, the signaling analysis unit 254 determines whether "TRUE" is designated as the signaling scope information (signaling scope all) by referring to the tuning information (FIC) recorded in the NVRAM 215.

In a case where "TRUE" is determined to be designated as the signaling scope information (signaling scope all) in step S293, the processing in step S294 is subsequently performed. In step S294, the filtering control unit 252 controls the filtering processing executed by the Demux 213 on the basis of the SCS bootstrap information. The SCS signaling obtaining unit 272 obtains the SCS signaling data such as the USED, the USD, the MPD, and the SDP transmitted in the ROUTE session in accordance with the result of the filtering processing executed by the Demux 213.

It should be noted that the SCS bootstrap information is set for each piece of class information such as the enhanced class and the core class, and therefore, the SCS signaling data according to the class information determined in the processing in step S271 of FIG. 20 is obtained.

On the other hand, in a case where "FALSE" is determined to be designated as the signaling scope information (signaling scope all) in step S293, the processing in step S295 is subsequently performed. In step S295, the signaling analysis unit 254 determines whether SCS broadband location information (uri attribute of SignalingOverinternet element) exits in the SCD or not by referring to the tuning information (SCD) recorded in the NVRAM 215.

In a case where it is determined in step S295 that the SCS broadband location information (uri attribute of SignalingOverinternet element) exists in the SCD, the processing in step S296 is subsequently performed. In step S296, the communication control unit 255 controls the communication unit 217 in accordance with the analysis result (uri attribute of SignalingOverinternet element) given by the signaling analysis unit 254, and accesses the broadband server 30 via the Internet 90, so that the SCS signaling data such as the USED, the USD, the MPD, and the SDP is obtained.

In a case where it is determined in step S295 that the SCS broadband location information (uri attribute of SignalingOverInternet element) does not exist, the processing in step S294 is subsequently performed, the SCS signaling data is obtained via the broadcast.

When the processing in step S294 or step S296 is finished, the processing in step S297 is subsequently performed. In step S297, the signaling analysis unit 254 analyzes the MPD obtained by the processing in step S294 or step S296, and determines components to be processed in the rendering processing (components to be viewed) from among the components enumerated in Representation elements in AdaptationSet elements.

In step S298, the signaling analysis unit 254 analyzes the USD and the MPD obtained in the processing in step S294 or step S296, and determines whether the distribution route of the stream of components to be obtained is via the broadcast or via the communication in accordance with whether the segment URL of the MPD is described in the broadcastAppService element or the unicastAppService element of the deliveryMethod element of the USD.

In a case where the distribution route of the components is determined to be via the broadcast in step S298, the processing in step S299 is subsequently performed. In this case, the SCS signaling data obtained in the processing of step S294 or step S296 is analyzed by the signaling analysis unit 254, and the analysis result thereof is provided to the filtering control unit 252.

Then, in step S299, the signaling obtaining unit 253 obtains the LSID transmitted in the ROUTE session in accordance with the result of the filtering processing executed by the Demux 213. The LSID obtained in the processing of step S299 is analyzed by the signaling analysis unit 254, and the analysis result thereof is provided to the filtering control unit 252. In step S300, the filtering control unit 252 controls the filtering processing executed by the Demux 213 on the basis of the analysis result (the IP address, the port number, the TSI, and the TOI) provided from the signaling analysis unit 254. Therefore, the Demux 213 executes the filtering processing of the LCT packets, so that the segment data is extracted from the LCT packet obtained therefrom, and the components constituting the tuned service is obtained (captured).

On the other hand, in a case where the distribution route of the components is determined to be via the communication in step S298, the processing in step S301 is subsequently performed. In step S301, the signaling analysis unit 254 analyzes the MPD obtained in the processing in step S294 or step S296, and provides the media segment information (segment URL) obtained from the result of the analysis thereof to the communication control unit 255. Therefore, the communication control unit 255 obtains the media segment information (segment URL) from the signaling analysis unit 254.

Then, in step S300, the communication control unit 255 controls the communication unit 217 in accordance with the media segment information (segment URL) given by the signaling analysis unit 254, and accesses the broadband server 30 via the Internet 90, so that the components constituting the tuned service are obtained (captured).

When the processing in step S300 is finished, the processing in step S302 is subsequently performed. In step S302, a determination is made as to whether all the components to be obtained are captured or not. In a case where all the components are determined not to have been captured in step S302, the processing in step S298 is subsequently performed again, and the processing subsequent thereto is executed.

More specifically, the processing in steps S298 to S302 is repeated, so that the components are obtained via the broadcast or via the communication, and in a case where all the components are determined to have been captured in step S302, the processing in step S303 is subsequently performed. In step S303, for example, the video data and the audio data obtained in the processing of step S300 are decoded, and the rendering processing and the like are performed, so that the video and the audio of the program corresponding to the service tuned in the processing in step S252 of FIG. 19 are reproduced, and the viewer starts to view the service (S303).

When the processing in step S303 is finished, the processing in step S282 of FIG. 20 is subsequently performed again, and the processing subsequent thereto is executed.

The flow of the tuning processing supporting the hybrid has been hereinabove explained.

7. MODIFICATION

In the above explanation, ATSC 3.0 which is a next generation broadcast standard in America currently being formulated is expected to employ digital broadcast using IP transmission method. Therefore, ATSC which is a method employed in American and other countries has been explained as the standard of the terrestrial digital television broadcast. Alternatively, the embodiment may also be employed to Integrated Services Digital Broadcasting (ISDB) which is a method employed in Japan and other countries and Digital Video Broadcasting (DVB) which is a method employed in each country in Europe. The embodiment is not limited to the terrestrial digital television broadcast, and the embodiment may also be employed in satellite digital television broadcast, digital cable television broadcast, and the like.

In the above explanation, "D" which is an abbreviation of Description is used as the name of the signaling data, but "T" which is an abbreviation of Table may be used. For example, the Service Configuration Description (SCD) maybe described as a Service Configuration Table (SCT). For example, the Service Parameter Description (SPD) may be described as a Service Parameter Table (SPT). However, the difference in these names are different in terms of a format between "Description" and "Table", and are not different in actual contents of the signaling data.

Further, in the above explanation, the signaling data is explained with regard to the elements and attributes in a case where the signaling data is described in a binary format and a text format, but the names of the elements and attributes are examples, and other names may also be employed. For example, the broadcast stream ID (Broadcast Stream ID) defined in the FIC and the like may also be referred to as a network ID (Network ID), an RF allocation ID (RF Alloc ID), an RF channel ID (RF Channel ID), and the like. However, the difference in these names are different in terms of a format, and are not different in actual contents of these elements and attributes.

8. CONFIGURATION OF COMPUTER

The series of processing explained above can be executed by hardware, or may also be executed with software. In the case where the series of processing is executed with software, a program constituting the software is installed to a computer. FIG. 22 is a figure illustrating a configuration example of hardware of a computer executing the series of processing with programs.

In a computer 900, a Central Processing Unit (CPU) 901, a Read Only Memory (ROM) 902, and a Random Access Memory (RAM) 903 are connected with each other by a bus 904. Further, the bus 904 is connected to an input/output interface 905. The input/output interface 905 is connected to an input unit 906, an output unit 907, a recording unit 908, a communication unit 909, and a drive 910.

The input unit 906 is constituted by a keyboard, a mouse, a microphone, and the like. The output unit 907 is constituted by a display, a speaker, and the like. The recording unit 908 is constituted by a hard disk, a nonvolatile memory, and the like. The communication unit 909 is constituted by a network interface and the like. The drive 910 drives a removable medium 911 such as a magnetic disk, optical disk, a magneto-optical disk, or a semiconductor memory.

In the computer 900 configured as described above, the CPU 901 loads the programs stored in the ROM 902 and the recording unit 908 to the RAM 903 via the input/output interface 905 and the bus 904, and executes the programs, so that the series of processing is performed.

For example, the program executed by the computer 900 (CPU 901) maybe provided by being recorded in the removable medium 911 serving as a package medium and the like. Alternatively, the program may be provided via wired or wireless transmission media such as a local area network, the Internet, and a digital satellite broadcasting.

In the computer 900, the program can be installed to the recording unit 908 via the input/output interface 905 by attaching the removable medium 911 to the drive 910. Alternatively, the program can be received by the communication unit 909 via a wired or wireless transmission media, and can be installed to the recording unit 908. Still alternatively, the program can be installed to the ROM 902 and the recording unit 908 in advance.

In this case, in this specification, the processing performed in accordance with the program by the computer may not be necessarily performed in time sequence according to the order explained with the flowchart. More specifically, the processing performed in accordance with the program by the computer also includes processing performed in parallel or individually (for example, parallel processing or objective processing). The program may be processed in a single computer (processor), or may be processed in a distributed manner by multiple computers.

It should be noted that the embodiment of the present technique is not limited to the above embodiments, and may be changed in various manners without deviating from the gist of the present technique.

The present technique may also be configured as follows.

(1)

A reception apparatus including:

a first obtaining unit obtaining first meta data including class information for providing, in multiple modes, a service identified by an IP address and transmitted by a broadcast wave of digital broadcast using an Internet Protocol (IP) transmission method; and a control unit controlling reproduction of a component by connecting to a stream of the component constituting the service for each of the multiple modes on the basis of the class information included in the first meta data.

(2)

The reception apparatus according to (1), wherein the class information includes bootstrap information for obtaining second meta data including information about the stream of the component for each of the multiple modes, and the reception apparatus further includes a second obtaining unit for obtaining the second meta data on the basis of the bootstrap information, wherein the control unit connects to the stream of component on the basis of the second meta data.

(3)

The reception apparatus according to (2), wherein the service is a service providing layered coding, and the class information includes information for providing a base layer and information for providing an enhancement layer.

(4)

The reception apparatus according to (2) or (3), wherein the first meta data includes signaling scope information indicating whether the component constituting the service can be obtained by using only the second meta data distributed via the broadcast, and the second obtaining unit obtains the second meta data on the basis of the signaling scope information.

(5)

The reception apparatus according to any one of (2) to (4), wherein the first meta data includes shortcut information indicating whether the stream of component constituting the service is a basic service that can be individually identified by a MIME type, or a service other than the basic service, and the second obtaining unit obtains the second meta data on the basis of the shortcut information.

(6)

The reception apparatus according to any one of (2) to (5), wherein the first meta data includes hybrid information indicating whether the stream of component constituting the service is distributed only via the broadcast or distributed via the broadcast and via the communication, and the second obtaining unit obtains the second meta data on the basis of the hybrid information.

(7)

The reception apparatus according to any one of (2) to (6), wherein the stream of component constituting the service is distributed via the broadcast or via the communication, and the second meta data is distributed via the broadcast or via the communication.

(8)

The reception apparatus according to any one of (2) to (6), wherein the first meta data is data in a binary format, and is first signaling data transmitted in a lower layer than an IP layer in a protocol stack of the IP transmission method, and the second meta data is data in a text format, and is second signaling data transmitted in a parent layer with respect to the IP layer in the protocol stack of the IP transmission method.

(9)

The reception apparatus according to (8), wherein the component constituting the service and the stream of the second signaling data are transmitted in a Real-time Object Delivery over Unidirectional Transport (ROUTE) session obtained by expanding File Delivery over Unidirectional Transport (FLUTE).

(10)

A reception method for a reception apparatus, wherein the reception method includes steps for causing the reception apparatus to:

obtain first meta data including class information for providing, in multiple modes, a service identified by an IP address and transmitted by a broadcast wave of digital broadcast using an Internet Protocol (IP) transmission method; and control reproduction of a component by connecting to a stream of the component constituting the service for each of the multiple modes on the basis of the class information included in the first meta data.

(11)

A transmission apparatus including:

a generation unit generating first meta data including class information for providing, in multiple modes, a service identified by an IP address and transmitted by a broadcast wave of digital broadcast using an Internet Protocol (IP) transmission method; and a transmission unit transmitting the generated first meta data.

(12)

The transmission apparatus according to (11), wherein the class information includes bootstrap information for obtaining second meta data including information about a stream of component constituting the service for each of the multiple modes.

(13)

The transmission apparatus according to (12), wherein the service is a service providing layered coding, and the class information includes information for providing a base layer and information for providing an enhancement layer.

(14)

The transmission apparatus according to (12) or (13), wherein the first meta data includes signaling scope information indicating whether the component constituting the service can be obtained by using only the second meta data distributed via the broadcast.

(15)

The transmission apparatus according to any one of (12) to (14), wherein the first meta data includes shortcut information indicating whether the stream of component constituting the service is a basic service that can be individually identified by a MIME type, or a service other than the basic service.

(16)

The transmission apparatus according to any one of (12) to (15), wherein the first meta data includes hybrid information indicating whether the stream of component constituting the service is distributed only via the broadcast or distributed via the broadcast and via the communication.

(17)

The transmission apparatus according to any one of (12) to (16), wherein the stream of component constituting the service is distributed via the broadcast or via the communication, and the second meta data is distributed via the broadcast or via the communication.

(18)

The transmission apparatus according to any one of (12) to (16), wherein the first meta data is data in a binary format, and is first signaling data transmitted in a lower layer than an IP layer in a protocol stack of the IP transmission method, and the second meta data is data in a text format, and is second signaling data transmitted in a parent layer with respect to the IP layer in the protocol stack of the IP transmission method (19)

The transmission apparatus according to (18), wherein the component constituting the service and the stream of the second signaling data are transmitted in a ROUTE session obtained by expanding FLUTE.

(20)

A transmission method for a transmission apparatus, wherein the transmission method includes steps for causing the transmission apparatus to:

generate first meta data including class information for providing, in multiple modes, a service identified by an IP address and transmitted by a broadcast wave of digital broadcast using an Internet Protocol (IP) transmission method; and transmit the generated first meta data.

REFERENCE SIGNS LIST

1 Service providing system
10 Transmission apparatus
20 Reception apparatus
30 Broadband server
90 The Internet
111 Signaling generation unit
113 Video data obtaining unit
115 Audio data obtaining unit
118 Transmission unit
212 Tuner
214 Control unit
217 Communication unit
251 Tuning control unit
252 Filtering control unit
253 Signaling obtaining unit
254 Signaling analysis unit
255 Communication control unit
256 Packet header monitor unit
271 LLS signaling obtaining unit
272 SCS signaling obtaining unit
311 Signaling generation unit
313 Video data obtaining unit
315 Audio data obtaining unit
318 Communication unit
900 Computer
901 CPU

The invention claimed is:

1. A reception apparatus comprising:
circuitry configured to
obtain first meta data including a service identifier of a program including at least one of an audio component and a video component, service category information, location information for obtaining service-specific signaling for the program, and class information, the class information indicating at least one video resolution capability required for presenting the program, the program is transmitted via a digital broadcast signal using an Internet Protocol (IP) transmission method, the first meta data indicating whether any component of the program is delivered separately from the digital broadcast signal, and the service-specific signaling is required to reproduce the program from the digital broadcast signal; and
control reproduction of the program by processing at least one component of the program based on the at least one video resolution capability indicated in the class information included in the first meta data, wherein the circuitry is further configured to
obtain the service-specific signaling, which is required to reproduce the program from the digital broadcast signal, based on the location information, and
process the at least one component based on the service-specific signaling, which is required to reproduce the program from the digital broadcast signal.

2. The reception apparatus according to claim 1, wherein the program is a program providing layered coding, and the class information includes information for providing a base layer and information for providing an enhancement layer.

3. The reception apparatus according to claim 1, wherein the first meta data includes signaling scope information indicating whether each of plural video component streams of the program can be obtained by using only the service-specific signaling distributed via broadcast, and
the circuitry is configured to obtain the service-specific signaling based on the signaling scope information.

4. The reception apparatus according to claim 1, wherein the first meta data includes shortcut information indicating whether each of plural video component streams of the program is a basic service that can be individually identified by a Multipurpose Internet Mail Extension (MIME) type, or a service other than the basic service, and
the circuitry is configured to obtain the service-specific signaling based on the shortcut information.

5. The reception apparatus according to claim 1, wherein the first meta data includes hybrid information indicating whether each of plural video component streams of the program is distributed only via broadcast or distributed via the broadcast and via communication, and
the circuitry is configured to obtain the service-specific signaling based on the hybrid information.

6. The reception apparatus according to claim 1, wherein each of plural video component streams of the program is distributed via broadcast or via communication, and
the service-specific signaling is distributed via the broadcast or via the communication.

7. The reception apparatus according to claim 1, wherein the first meta data is data in a binary format, and is first signaling data transmitted in a lower layer than an IP layer in a protocol stack of the IP transmission method, and the service-specific signaling is data in a text format, and is second signaling data transmitted in a parent layer with respect to the IP layer in the protocol stack of the IP transmission method.

8. The reception apparatus according to claim 7, wherein the video component of the program and the second signaling data are transmitted in a Real-time Object Delivery over Unidirectional Transport (ROUTE) session obtained by expanding File Delivery over Unidirectional Transport (FLUTE).

9. A reception method for a reception apparatus, the reception method comprising:
obtaining first meta data including a service identifier of a program including at least one of an audio component and a video component, service category information, location information for obtaining service-specific signaling for the program, and class information, the class information indicating at least one video resolution capability required for presenting the program, the program is transmitted via a digital broadcast signal using an Internet Protocol (IP) transmission method, the first meta data indicating whether any component of the program is delivered separately from the digital broadcast signal, and the service-specific signaling is required to reproduce the program from the digital broadcast signal; and
controlling reproduction of the program by processing at least one component of the program based on the at least one video resolution capability indicated in the class information included in the first meta data, wherein the reception method further comprises:
obtaining the service-specific signaling, which is required to reproduce the program from the digital broadcast signal, based on the location information; and
processing the at least one component based on the service-specific signaling, which is required to reproduce the program from the digital broadcast signal.

10. A transmission apparatus comprising:
circuitry configured to
generate first meta data including a service identifier of a program including at least one of an audio component and a video component, service category information, location information for obtaining service-specific signaling for the program, and class information, the class information indicating at least one video resolution capability required for presenting the program, the program is transmitted via a digital broadcast signal using an Internet Protocol (IP) transmission method, the first meta data indicating whether any component of the program is delivered separately from the digital broadcast signal, the service-specific signaling is required to reproduce the program from the digital broadcast signal, and the service-specific signaling, which is required to reproduce the program from the digital broadcast signal, is to he obtained based on the location information; and
transmit the generated first meta data.

11. The transmission apparatus according to claim 10, wherein
the program is a program providing layered coding, and the class information includes information for providing a base layer and information for providing an enhancement layer.

12. The transmission apparatus according to claim 10, wherein the first meta data includes signaling scope information indicating whether each of plural video component streams of the program can be obtained by using only the service-specific signaling distributed via broadcast.

13. The transmission apparatus according to claim 10, wherein the first meta data includes shortcut information indicating whether each of plural video component streams of the program is a basic service that can be individually identified by a Multipurpose Internet Mail Extension (MIME) type, or a service other than the basic service.

14. The transmission apparatus according to claim 10, wherein the first meta data includes hybrid information indicating whether each of plural video component streams of the program is distributed only via broadcast or distributed via the broadcast and via communication.

15. The transmission apparatus according to claim 10, wherein each of plural video component streams of the program is distributed via broadcast or via communication, and
the service-specific signaling is distributed via the broadcast or via the communication.

16. The transmission apparatus according to claim 10, wherein
the first meta data is data in a binary format, and is first signaling data transmitted in a lower layer than an IP layer in a protocol stack of the IP transmission method, and
the service-specific signaling is data in a text format, and is second signaling data transmitted in a parent layer with respect to the IP layer in the protocol stack of the IP transmission method.

17. The transmission apparatus according to claim 16, wherein plural video component streams of the program and the second signaling data are transmitted in a Real-time Object Delivery over Unidirectional Transport (ROUTE) session obtained by expanding File Delivery over Unidirectional Transport (FLUTE).

18. A transmission method for a transmission apparatus, the transmission method comprising:
generating first meta data including a service identifier of a program including at least one of an audio component and a video component, service category information, location information for obtaining service-specific signaling for the program, and class information, the class information indicating at least one video resolution capability required for presenting the program, the program is transmitted via a digital broadcast signal using an Internet Protocol (IP) transmission method, the first meta data indicating whether any component of the program is delivered separately from the digital broadcast signal, the service-specific signaling is required to reproduce the program from the digital broadcast signal, and the service-specific signaling, which is required to reproduce the program from the digital broadcast signal, is to be obtained based on the location information; and
transmitting the generated first meta data.

19. The reception apparatus according to claim 1, wherein the service identifier included in the first meta data is of a program transmitted via a digital broadcast signal using an IP transmission method.

20. The reception apparatus according to claim 1, wherein the audio component and the video component of the program are transmitted via a Real-time Object Delivery over Unidirectional Transport (ROUTE) session.

* * * * *